United States Patent [19]
Pocock et al.

[11] Patent Number: 5,679,077
[45] Date of Patent: Oct. 21, 1997

[54] SYSTEM AND METHOD FOR REMOTE PARTICIPATION IN BINGO AND OTHER GAMES OF CHANCE WHERE PLAYERS SELECT NUMBERS

[76] Inventors: Terrence Pocock; Andrew Pocock, both of 93 Main Street, Delaware, Ontario, Canada

[21] Appl. No.: 514,246

[22] Filed: Aug. 11, 1995

[51] Int. Cl.$^6$ .................................................... A63F 9/24
[52] U.S. Cl. ................................................ 463/19; 463/41
[58] Field of Search ............................ 463/19, 18, 17, 463/16, 41; 273/439, 269, 237

[56] References Cited

U.S. PATENT DOCUMENTS

| | | |
|---|---|---|
| 4,373,726 | 2/1983 | Churchill et al. . |
| 4,909,516 | 3/1990 | Koliniky . |
| 5,007,649 | 4/1991 | Richardson . |
| 5,297,802 | 3/1994 | Pocock et al. ................. 273/269 X |
| 5,324,035 | 6/1994 | Morris et al. . |
| 5,340,119 | 8/1994 | Goldfarb ............................ 463/18 |
| 5,377,975 | 1/1995 | Clapper, Jr. ....................... 463/17 |

*Primary Examiner*—Raleigh W. Chiu
*Assistant Examiner*—Michael O'Neill
*Attorney, Agent, or Firm*—Burns, Doane, Swecker & Mathis

[57] ABSTRACT

A system and method for remote players to select the numbers on a bingo card and to have this card played in a local Do-It-Yourself bingo game. Remote players wishing to play use a telephone to select the numbers on a game card that is entered into a remotely located bingo game. This entry process also acquires the players identification information. Billing is provided by a '900' number billing service or by charging a player's credit card account. A computer system plays the randomly selected balls against all the entered game cards, and determines the winners. No game cards are manufactured or distributed as the players create their own cards. Local and remote players are assured that the game is legitimately played as all the remote players cards are printed out at the game site and stored in lock boxes similarly to the local players' cards as proof of the bingo numbers selected and payment made for game entry.

53 Claims, 11 Drawing Sheets

SYSTEM AND METHOD FOR REMOTE PARTICIPATION IN BINGO AND OTHER GAMES OF CHANCE WHERE PLAYERS SELECT NUMBERS

FIELD OF THE INVENTION

The present invention relates to a system for remote players to use the telephone to select the numbers on a bingo card for entry and play in a remotely located Do-It-Yourself bingo game, or similar type of game. In certain games of the invention the remote player remains connected to the system for the duration of the number of games that he wishes to play.

BACKGROUND OF THE INVENTION

In the Do-It-Yourself bingo games held in regular bingo halls, the players purchase a two-part carbon bingo card on which they write their own personally selected bingo numbers. Each player keeps one part for play and the other part is placed in a lock box at the end of the player's table. During the game, if all the player's selected numbers are matched by the bingo balls as they are drawn, the player declares bingo. The bingo game management then obtains the original copy from the lock box to verify that no changes were made to the player's bingo card during the game to create an illegal win. It can be seen that this form of local bingo game is very difficult for remote players to enter and play, particularly in the massive numbers generated by a television game show. It is an objective of this invention to allow large numbers of off-site remote players the same facility to select the numbers on a bingo card and to have that bingo card entered and played in the local bingo game as if the player were personally on site.

In the local Do-It-Yourself bingo game, the players purchase a bingo card which acts as proof of entry into the bingo game. These same local players also require proof that all remote players have paid the appropriate entry fee. This invention ensures that all players entered in the game have paid properly.

In the local Do-It-Yourself bingo game all players know that the selected bingo numbers cannot be altered during the game because the original record of the selected numbers is stored in a lock box. This invention ensures that none of the bingo cards entered, whether local or remote, can be altered during the game.

In the local Do-It-Yourself bingo game, players independent of game management examine a winning player's card located in the lock box to determine if the card is a winner and that no one had tampered with the player's selected numbers. It is an intention of this invention to supply satisfactory proof of winning to the examining local players of any remote player's winning card.

Under certain laws of the United States such as the Indian Gaming Regulatory Act 1988, it may be necessary for remote players to be represented by an on-site agent who enters and plays the game cards for the remote players in a regular game held at a designated site, e.g., on an Indian reservation. It is possible for more than one agent in a game to represent various sets of home players or for one agent to represent thousands of remote players.

The agent is not necessarily part of the game management and in local bingo games the on-site agents must prove that all of their remote players are properly entered and paid for. The hall management must prove that all winners are determined legitimately for both the local players and the remote players that are represented by the agent. It is a function of this invention that individual copies of the invention be used by one or more agents, enabling remote players to play in bingo games held on designated sites and provide accountability to the local players for all the entries of the remote players.

In certain television bingo games the waning players place telephone calls to the television station to inform the game organizers of their bingo. Multiple players are able to win at the same time and each bingo card must be verbally verified by telephone, which entails all the selected numbers being read back to the verifier for each winning bingo. This process is time consuming, boring for the television audience and prone to both error and pranks since the verification calls are made to a publicly announced telephone number. The current invention seeks to eliminate all of this manual verification process.

Although it may be possible to distribute Do-It-Yourself cards to remote players, collect the cash charges to play bingo, have the players select the bingo numbers, mail the cards into the game site and then have someone play the cards for them in the game, the logistics, handling and chance of error make this manual alternative impractical. The card turnaround delay alone allows only one game a week. This invention eliminates these physical distribution problems and allows for the playing of multiple games per day.

The game entry process must be failsafe, the identity of players and the accuracy of the numbers they have selected must always be available for immediate verification and audit by outside auditors. The present invention enables security measures to be employed that detect and avoid both fraud and misuse at the security level required for a public television or radio show.

Many homes in a television game show area may not have Touch Tone telephones and some household members may have difficulty operating the Touch Tone keys. It is an objective of this invention to provide the required facility to remove these problems.

The majority of potential players are at work during the day and therefore unable to play the game bacause of the telephone cost to their employer or perceived loss of work time. This invention provides cost free access to the game for the player whether by telephone entry or from a facsimile entry through the use of a free fax entry line. Character recognition is used on these faxes for automatic entry into the game. The faxed entry form is an automatic process not requiring any office time or cost to transmit because of automatic diallers, load trays and the toll free number.

In regular bingo games including Do-It-Yourself games no information is retained about the players to assist in further marketing to that base of players that have already played the game. Since this information is not retained the same data must be input for each player entry which is time consuming and error prone for the player. It is an intention of this invention to use modern database techniques to maintain information about all players as well as reducing player input time and errors.

With remote players entering the game by telephone it is difficult to collect money for the service so that the game operator knows that payment will be made prior to the commencement of the game. This invention through 900 numbers and pre-authorized credit card billing eliminates the potential remote player billing problem.

As with any local game, potential remote players need to feel they are participating in the game to obtain any competitive satisfaction from entering and playing in the game. This invention allows many remote players at once to feel they are participating in the local game through the use of either a television or radio broadcast or through continuous connection for the duration of the game.

In regular bingo games one or more winners are declared when a pattern of numbers on the player's cards is matched by the bingo balls as drawn in the game. This produces a satisfactory win ratio for the number of players in the average bingo hall. However in a mass audience television show one or two winners per game does not maintain sufficient player interest. Drawing more balls after the initial bingo and awarding additional lower level prizes for many more winners produces significant administrative control problems in a mass audience televised bingo game. This invention allows the efficient awarding of additional prizes on subsequent balls to many more players through the use of computer controls and database techniques.

It is important to the credibility and reputation of groups sponsoring such games that the television game show system operate reliably without error or detectable failure, particularly under the scrutiny of a large television audience. This invention seeks to maintain reliability through fault tolerant design, redundant system capabilities and hard copy printouts visible to all players.

In many consumer oriented on-line systems the user is required to input a large number of digits to provide user identity. It is an object of this invention to reduce this input.

Although the preferred method of distributing bingo game information to the remote viewers is via cable TV or broadcast television, this capacity may not be available. This invention resolves this problem through the use of telephones only to obtain player input information and to inform the remote players of the progress of the bingo game.

A popular bingo game that is difficult for remote players to enter into is Lightning Bingo where a player has only three numbers on the bingo card instead of the regular twenty five. The player pays a fee to play of approximately one dollar and places a three-dollar ante in front of his card in preparation to play. Numbers are drawn by management and when a drawn number matches a number on the player's card, the player withdraws one dollar from the ante pool in front of him. When any player matches all three numbers on his bingo card, he declares bingo and wins all the money left in front of the remaining players. This game moves very quickly generally, taking less then two minutes per game. It is an intention of this invention to allow remote players to select their own card numbers and play Lightning Bingo via a telephone connection in the same game as local players. This game may or may not be broadcast over television or radio as telephone alone is sufficient to play the game.

The ability to select one's own bingo numbers for a bingo game adds a new dimension to the perceived value of the television game show because of the player involvement. This invention addresses and removes the problems described previously that have prevented the practical development of a mass audience, choose-your-own-number television game show, particularly the fast moving lightning games that use the facilities of an on-site agent.

SUMMARY OF THE INVENTION

According to the disclosed invention a computer system operates programs that control peripheral devices that accept telephone entries in the form of remote player-selected numbers for a Do-It-Yourself bingo game card which is stored in the computer memory. The computer system directs an attached hard copy printer to print out the stored bingo cards with a sequence number and appropriate player identification. These cards serve as proof of entry into the local bingo game and are placed in the local game lock box in a similar manner to the bingo cards of the local players. The computer system plays these game cards in the bingo game by accepting input of randomly selected numbers as drawn in the game. The game is over when either a local player calls bingo or when all of the numbers on one of the remote players' bingo cards is matched by the drawn numbers, which causes the computer system to declare the remote player a winner. If the winner is a local player, management checks the player's duplicate card in the lock box to determine the validity of the bingo. If the winner is a remote player, a copy of the player's card is printed to show the local players it contains a valid bingo for a valid player. The sequence number is used to quickly retrieve the copy of the remote player's card previously placed in the lock box to show to all the players proof of proper entry and that no tampering went on with the numbers as selected by the remote player.

The remote players interact with the computer system through a telephone system that is attached to the computer system that generates and speaks voice messages, digitally records and stores voice messages, accepts Touch Tone input, connects a terminal operator with bingo game players, and bridges a player to an announcer so that the television audience hears their conversation. This telephone system automatically accepts the remote player's selection of bingo numbers and, for specific games, the locations of these numbers on the card, if required. In certain cases the telephone system bills the players for playing, and informs the players of any winnings.

In a preferred embodiment the automated voice response unit of the telephone system prompts Touch Tone entry of information from the bingo players. Alternately, the players without Touch Tone telephones speak their entries into a telephone system equipped with voice recognition capabilities. This entry information of the personal identification number and the bingo card numbers can also be obtained manually by a customer service operator linked via the telephone system to a bingo player who doesn't have or who has difficulty operating a Touch Tone telephone. The customer service representative inputs the information into the computer system via an on-line terminal connected to the computer system.

Other than the selected bingo numbers, a player is only required to input a small family member personal identification number since the system has already received the player's home telephone number via the ANI Automatic Number Identification service of the telephone company. The combined telephone number and the small family member identification number produce the unique player identification number that the system uses to identify the owner of bingo cards for entry and play. As well as the player-selected bingo numbers, the system also asks for and records the player's name associated with the identification number to use for verification purposes on subsequent transactions and to use when announcing a winner.

The complete transaction including the personal identification number is associated on entry with a date and time stamp of the transaction and stored with other information to provide an audit trail for each entry.

The above Touch Tone or operator input transactions are stored as digital data. It is preferable however to digitize and store an audio recording of the complete transaction to resolve any future disputes regarding the transaction. The system records and digitizes these transactions along with other historical data and everything is backed up onto WORM (Write Once Read Many) discs for a permanent record of all entries into every game.

The computer system takes each random bingo number as selected and determines if it matches one of the numbers on the player's stored bingo cards. A winner is determined when all of the numbers on the player's card have been matched with drawn balls.

When a remote winner is determined, the computer system obtains the player identification associated with the winning bingo card and prints out the player's card at the local site which contains the sequence number and the player's identification. The player's card is quickly located in the lock box by using the sequence number. Individuals charged with the audit responsibility ensure that no tampering occurred with the numbers on the player's card by comparing the winning card printed out with the card stored in the lock box.

The computer system informs the announcer or the on-site agent of the player's bingo and, if requested, calls the player to inform the player of the wigs. The player's telephone number is displayed over the television channel, or alternatively the player's name is announced as it was recorded in the database.

The telephone system automatically telephones winners and by voice response informs them of their winning status and if required bridges them to the television announcer and to the television audience for an on-air interview.

The computer system of this invention maintains databases as required of game information including data about game cards, the type of telephone service, player information, game transactions and statistics. These databases allow the system to recognize first time players, players who have not played lately, the frequency of play of any players, players who have won free games and multiple players from one household. This database of information is acted upon to generate special messages, automatically telephone players and award free games or other predetermined activities.

In certain situations the database contains an indication that the player authorized an on-site agent to enter and play his game cards. The authorizing transaction is not only stored in the on-line database but stored in a WORM device for historical audit purposes.

In the preferred embodiment of the invention, players dial a '900' number set up by the telephone company to communicate with the television game show telephone system. This '900' number authorizes the telephone company to automatically bill the player for the charges to play bingo on the player's next telephone bill. Alternatively, where a player is calling from an office where he is unable to use a '900' number, the game charges are directed to the player's personal credit card account. In other situations, players establish regular charge accounts to play with prepaid deposits. These accounts are billed by the system as required with any winnings credited to the account if requested.

In certain circumstances it may be necessary for remote players to use an on-site agent to play their cards for them in the game. The system of this invention can be used by one or more on-site agents to represent many remote players in a local game. Prior to game time the agent receives instructions from remote players to enter and play the remote players' cards where the remote players have selected the bingo numbers. These cards are printed out at the game site and entered in the game along with a payment by the agent for all the entries. The cards are stored in the same local lock box with all the local players' cards. During the game, the agent inputs the numbers as they are called into his system, which determines if any of the agent's remote players are winners. When a remote player wins, the agent prints out a copy of the winning remote player's card, which game management or other auditors check against the cards previously printed, and stored in the lock box to verify the win. The agent collects the winnings and forwards them on to the remote player by mail or other means.

Another alternative to the telephone, cable TV or television broadcast to collect player game card information and to distribute the bingo game is to use a facsimile machine to communicate back and forth between the player and the computer system with character recognition capability. In this mode the computer system can generate a facsimile of the bingo card without the numbers and send it to the potential player. The player then selects his own numbers and writes them on the card along with personal identification and credit information. The player faxes this back to the computer system where character recognition software deciphers the information written on the faxed card. The bingo numbers are entered into the game by the player's agent or game management and payment for playing is arranged via the credit card information. Copies of these player-faxed cards can be printed out for storage in the lock box or for any of the other verification processes. Communication of the balls drawn in the game and another blank card are faxed back to the players along with any winning information. This distribution method is equally applicable to keno cards or lottery numbers where the player-selected numbers are printed out by the computer for later verification.

To play the faster game of Lightning Bingo, players call into the telephone system of either game management or a players' agent. The remote players are prompted by the computer to enter the three selected bingo numbers they want to play, which they input via their Touch Tone telephones. These entries are printed out at the game site as proof of payment for entry and to verify the validity of any remote winners. As the game is played, the players either see the balls drawn over television, hear the game on radio or hear the game over the telephone handset. If a remote player is the winner this is announced to them over the telephone connection, or alternately via radio or television depending on the size of the award.

The accumulated prize pool is divided into segments where, for example, the first third of the prize money is awarded to the first player to bingo and the second and third segments awarded to the winners on the drawing of two or more subsequent balls, to increase the total number of winners. Alternatively players who have a ball covered on another players bingo are awarded a consolation prize to increase the number of winners. There are many ways to increase the numbers of winners of small consolation prizes by drawing more balls, or using the balls previously drawn in a lottery fashion. Since the computer follows every card it is possible to ensure a large amount of small wins by tracking the number of people satisfying some constraint for the consolation prizes. The computer system keeps track of all these variations of prize money and the players the money is awarded to.

Since the player is already on line, all that is required for the player to enter the next game is for the player to indicate he wants to play and whether he wants to change the numbers on the bingo card. Billing is maintained in a running account with the final bill charged to the credit card account or until a prepaid balance is used up. At any time the player can request a check for any net winnings to be mailed to the player.

When the elements of this invention are combined together it is possible to operate a mass audience television game show where remote players select their own numbers to play in a local bingo game multiple times per day.

One special game of bingo held in certain areas is called Decision Bingo. This game requires players to pay an initial ante and then pay additional amounts for every three bingo balls called in the game. If a player doesn't think the chances of winning are good he drops out. In the televised version of Decision bingo, the player indicates his intentions by using the Touch Tone telephone or other input method and is billed automatically by the system. This interactivity is expensive as each player has to make and maintain a long distance telephone call to the game site for the duration of the game. An objective of this invention is to make televised interactive game shows on a national scale economical.

As well, once a player is connected throughout the entire game, all interaction with the player can be performed over the telephone handset and neither a television, radio, nor any other communication device needs to be used other than the direct connection. This allows Decision bingo, Lightning bingo, Normal Bingo and Do-it-Yourself bingo to be played as a telephone bingo and not a television bingo.

A function of this invention is the ability to separate the telephone system from the game site computer system and locate it in any remote city. Players then make a local telephone call to the local telephone system which prompts for and accepts the responses required to play the game. All of these responses are converted into compressed digital data and transmitted economically to the computer system at the game site over a digital network.

DETAILED DISCLOSURE

This invention pertains to a system and method to play a television game show based on random number selection, where local and remote players participate in the same game. In the following description, an embodiment of the invention is described with specific reference to the game of bingo. It's applicability to other games of chance that are based upon randomly selected numbers will be readily apparent.

Figure 1:
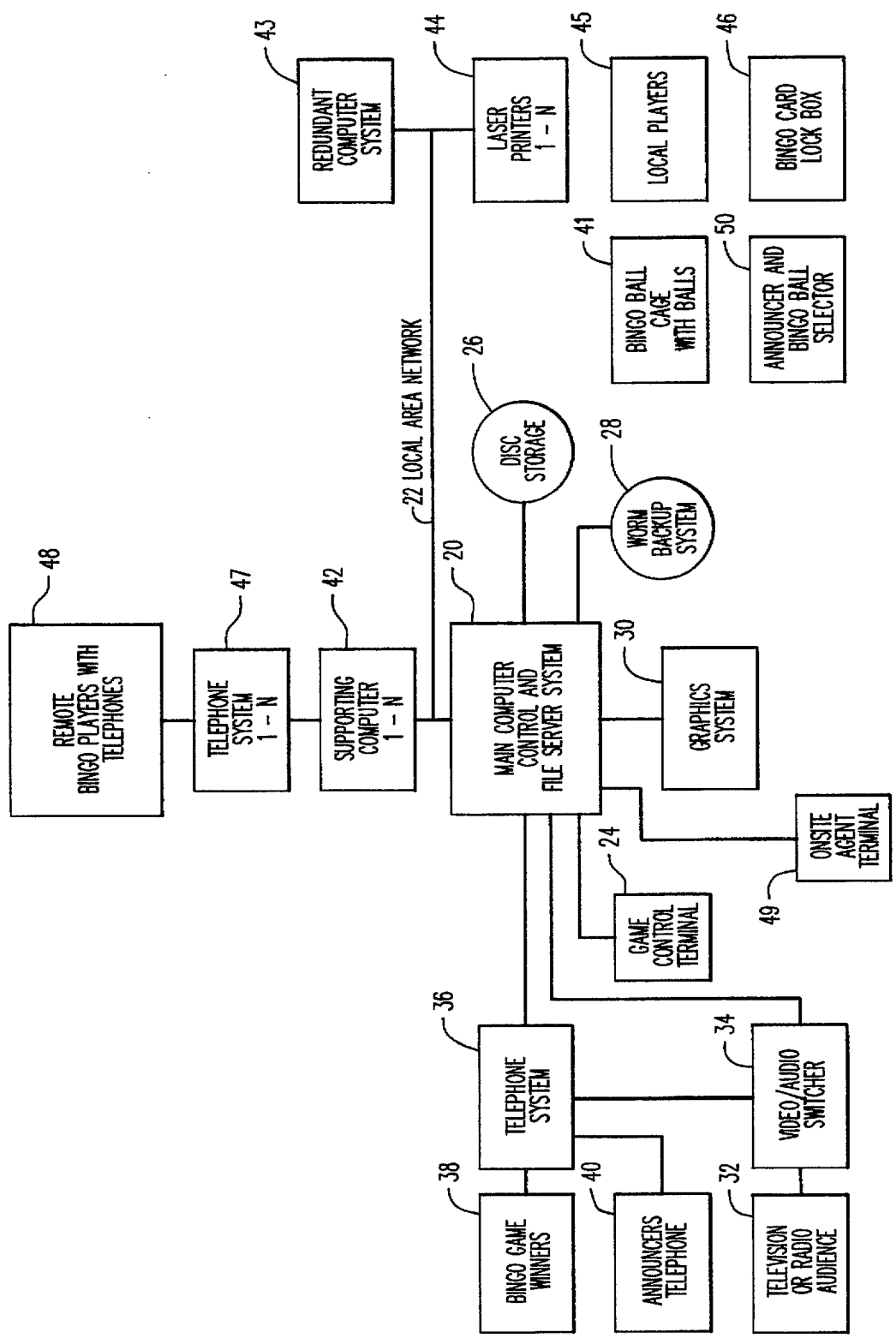
FIG. 1 is a block diagram of the system components required for remote players to play in a local televised Do-It-Yourself bingo game.

Referring more particularly to FIG. 1, there is shown a generalized block diagram illustrating a computer supported television game show system that locally prints bingo cards where the player, a television viewer, has selected the numbers on the bingo cards and plays these cards in a televised bingo game held in a location remote from the viewer. This system includes a general purpose CPU 20 which controls all aspects of the invention and also acts as a fie server connected to a LAN (Local Area Network) 22. The programs of the computer system are controlled by instructions that are input into the Game Control Terminal 24. The CPU 20 contains the computer programming means to start up, interact with, and control all the peripheral devices that make up the television bingo system. A disk storage system 26 is directly connected to the CPU 20. The disk stores all the files and programs for the system which are shared by the other computer processors connected to the LAN 22. Files are directly backed up on to a connected WORM (Write Once Read Many Times) disk 28; a non erasable removable compact disk system that provides overall system security, protection from fraud and a permanent audit trail of all transactions.

A graphic display system 30 is an integral part of the CPU 20 and outputs to the television broadcast coloured text, graphics, instructions and graphics of winning bingo patterns and other information of interest to the players. The graphic display system outputs to the television audience 32 through a video/audio switcher 34 which blends various picture and audio sources together to produce the television signal.

In another version of the invention the function of the television broadcast is provided by a radio broadcast which is transmitted through the video/audio switcher 34. A telephone system 36 is also connected to the CPU 20. The telephone system 36 accepts Touch Tone (DTMF) input and converts it to digital data for use by the CPU 20. It prompts for user input by voice response and accepts voice input by voice recognition from players without Touch Tone telephones. The voice generating function of the telephone system, under control of the CPU 20, speaks audio messages describing the bingo game to the audience 32 through the switcher 34. The telephone system 36 has the ability to dial out to bingo game winners 38 and inform them of their winnings by voice response and to bridge together players, announcers, or customer service operators.

The local area network 22 links the CPU 20 with a series of N supporting computer systems 42 and a redundant computer system 43. The supporting computer system 42 directs and controls the attached telephone system 47 connected to it that accepts calls from bingo players. This telephone system in the preferred embodiment has voice response means to prompt the players to input the bingo cards and other required information. The telephone system also has Touch Tone (DTMF) decoding means so that it converts the player's Touch Tone (DTMF) input to ASCII characters for transmission to the supporting computer system 42. The supporting computer system 42 stores the player-selected numbers in its memory along with other player information and also sends all this information to the main computer 20 via the LAN 22 for storage in the Bingo Game Database in the disk storage system 26. The telephone system has DNIS (Dialled Number Identification Service) which determines which programs to bring up and run to handle the player's call based on the telephone number player dialled. For example if the player dialled 1-900-TVBINGO the system would respond to the call with prompts for a 900 type call as opposed to prompts for when they dialled 1-800 type call.

In a preferred embodiment of the invention, the telephone system has voice recognition capability so that bingo players without Touch Tone (DTMF) telephones input the required information by spoken words and numbers. In the diagram of FIG. 1 just one supporting computer system 42 is shown; however, the number of these systems connected to the LAN 22 is varied accordingly to the number and distribution of the player telephone calls to enter the bingo games. For example where a bingo game is being played once each day, and telephone entries on average take 60 seconds; with 50% of the entries occurring in the last hour prior to game time; and with a supporting computer that is able to manage 48 telephone ports then:

1 call/min.*60 min.*48 ports=2,800 calls (approx.)

for the busy hour or approximately 5,000 calls per day are processed by the one support system. In one version of the invention the bingo card on which the players selected the numbers are stored in the memory of the support computer system 42 and are played in the game using the resources of this support computer system 42. The support computer system 42 reports any winners among its players to the main computer system 20. This processing is completed in the time it takes to draw each ball. In an alternate version the cards are stored in the main computer 20 and each ball drawn is played against the stored cards.

The telephone system 47 acquire player names and other information; digitally records it and transmit this information via the LAN 22 to the CPU 20 for storage and retrieval on the disc storage means 26.

At the start of each game the local players write the numbers of their selection on a two-part carbonized bingo card. One copy of this card is torn off and stored in the lock box 46 located at the end of the player's table.

A copy of all the remote players' cards, including their selected bingo numbers, the card sequence number and player identification is printed out by the printer 44. These cards are also placed in the lock box 46 along with the local players' cards. As the remote players' cards are printed the computer system 20 calculates the entry fees for the remote players and prepares a check to pay for the charges to play bingo. This sequence of actions insures all players both local and remote that everyone playing in the game has paid and the numeric selections on their bingo cards cannot be tampered with.

When the game commences the lock boxes 46 are secured and the announcer selects the first ball from a ball cage 41 and shows it to the local audience 45. Then the ball is displayed over television or announced over radio or the telephone to inform the remote players 48. The ball number is then entered into the computer system 20 using the game control terminal 24. The main computer system 20 then passes the ball number to the support computer systems 42 where the ball number is played against the players selected numbers. The announcer continues to draw balls until a local player shouts bingo or the system informs the announcer of a remote winner on the game control terminal 24. The system 20 was informed of the win from one of the support computers 42.

The object of the Do-It-Yourself bingo game is to be the first player to match that player's selected numbers with the balls that are randomly drawn. In some cases more then one player at a time can be a winner.

If the winner is a local player his card is checked by local management to determine if the numbers written on his card match the numbers that were drawn. If they do, the local player's card is found in the lock box using the sequence number to identify it. This card from the lock box is used to verify that the local player's card was not altered during the game.

If the player was a remote player, the computer system 20 causes the printer 44 to print out a copy of the remote player's card including the selected numbers, the card sequence number and the player identification. The sequence number is used to locate the remote player's card in the lock box 46. The player selected numbers on the player's bingo card are compared with the ball numbers as drawn to verify the win of the remote player.

The on-site agent terminal 49 is connected to the CPU 20 which informs the agent when a player who has authorized the on-site agent to play their bingo cards as though the player was physically at the bingo game location and has won a bingo game.

It is possible for one of the support systems to fail during the period of accepting entries without prospective players perceiving a system failure since there are multiple support computer systems. However, during the televised game the loss of one of the support systems playing bingo with approximately 5,000 entries is unacceptable. A redundant computer system 43 is connected via the LAN 22 to the CPU 20 to serve as a backup processor in case of failure of one of the support computer systems. When there is a failure, the entries stored in the disk storage 26 associated with the failed support computer system are down-loaded over the LAN 22 to the redundant computer system 43 along with a file of the bingo balls in the order they were selected. The redundant computer system 43 replays the selected balls against the entries and bring itself up to date, then notifies the CPU 20 that it is ready to take over for the failed system. All supporting computer systems commence play again on direction of the CPU 20.

The CPU 20 is shown in FIG. 1 in a single processor configuration; however, for redundancy purposes another similar system is attached to the LAN 22 and constantly updated so that control of the overall system is maintained should the main CPU system 20 fail.

Figure 2:
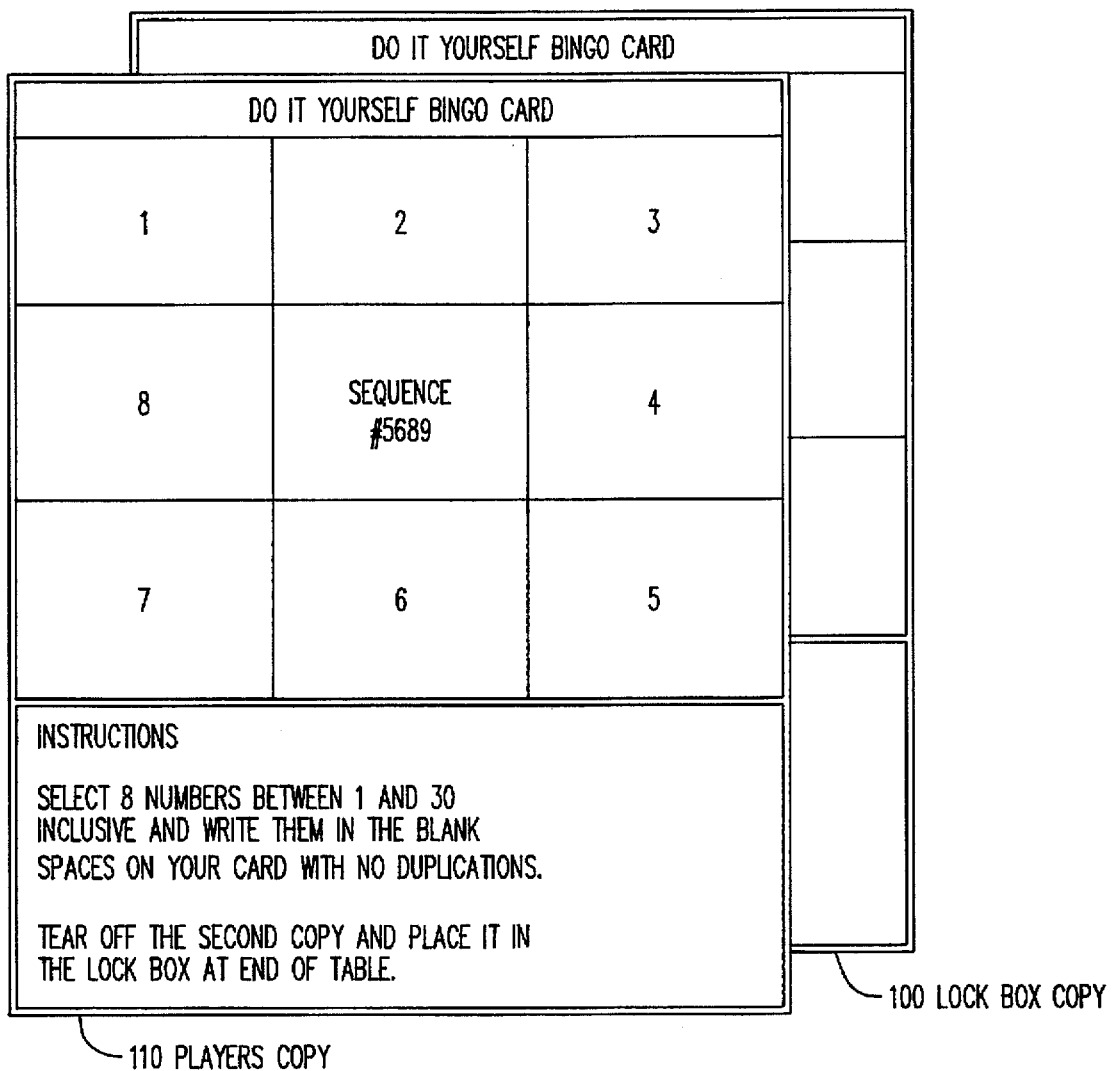
FIG. 2 illustrates a sample Do-It-Yourself bingo card.

The Do-It-Yourself bingo card is illustrated in FIG. 2. The card 100 is constructed from a two-part carbonized form. The local player selects eight numbers between one and thirty and writes them into the eight blank spaces 110 on the player's card 100. The player keeps one copy for himself and places the second copy in the lock box at the end of the player's table.

Figure 3:
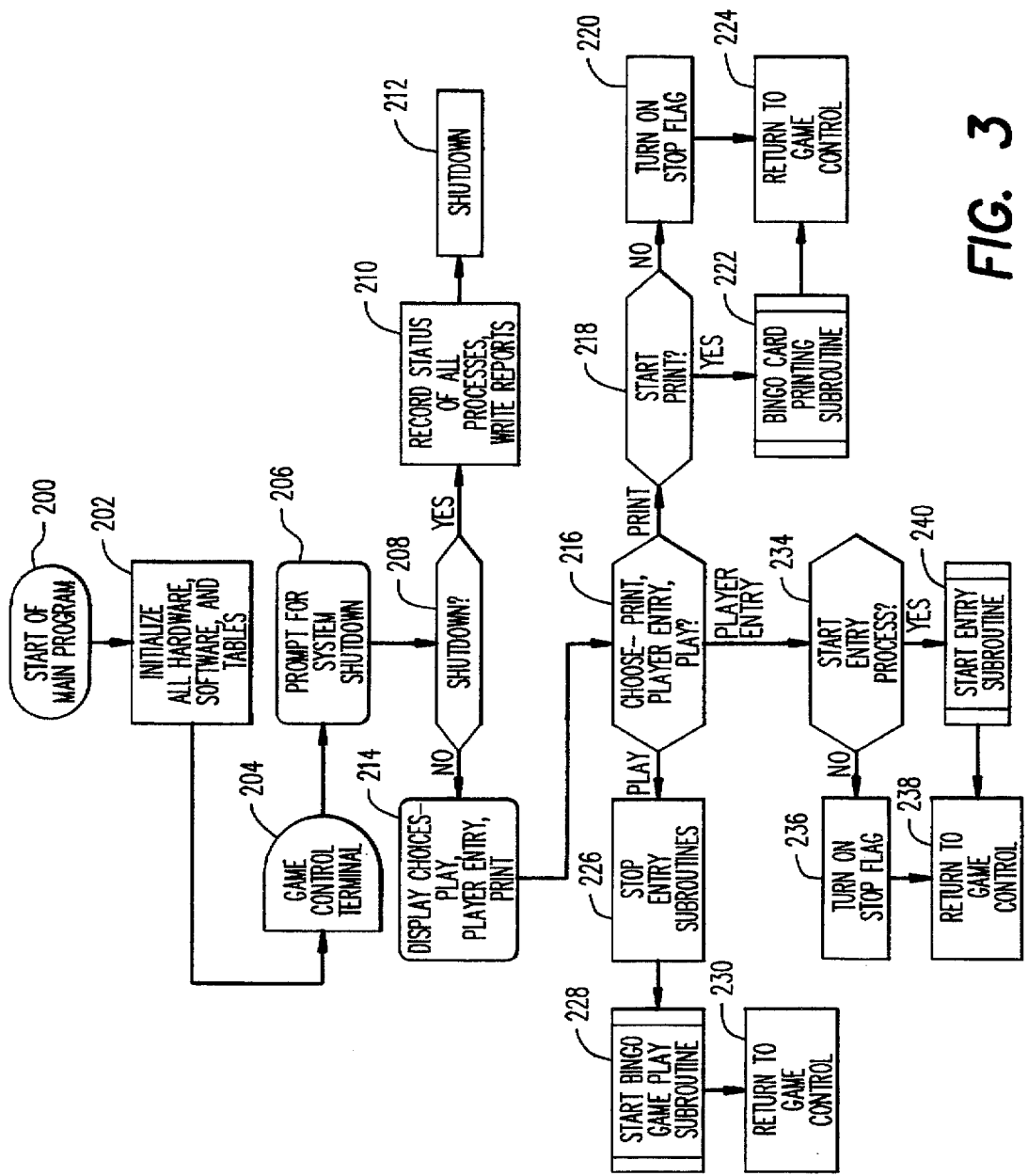
FIG. 3 is a flow chart of the Main Control Program.

The Main Program as illustrated in FIG. 3 controls all the Subroutines and processes that accept entries into the bingo game, prints the bingo cards, plays the game and determines winners so that a mass audience concurrently plays in the televised bingo game. All the Subroutines called by the Main Control Program are described later in this disclosure. At 200 the Main Control Program and Subroutines are loaded into the computer's memory and the program started. All hardware, software, and tables are initialized at 202.

The hardware runs a self-diagnostic check for faults and informs the operator of its state and attempts to replace any faulty components of the system with redundant components.

The software is initialized at 202 and confirms that the components are correctly loaded in memory and communications between all devices are operational.

The system is controlled by an operator who is prompted to input commands through the terminal at 204. The operator is first prompted whether the system should shut down at 206. If the operator directs the computer to shut down at 208 the computer outputs a status report to the operator at 210. The computer then shuts down the bingo process at 212. If the operator prompts the computer not to shut down at 208 the computer displays the operator control choices at 214.

The operator is asked to choose whether he wants to work with the Bingo Printing Process, Bingo Player Entry Process, or the Bingo Play Process at 216.

The operator stops or starts the Bingo Printing Process 218 which generates, formats, and transmits via the LAN 22 the player-created bingo cards to be printed on the connected laser printers. If the operator starts the Bingo Print Process the computer proceeds to the Bingo Card Printing Subroutine 222 and begins the card printing process and returns back to Game Control at 224. If the operator chooses to stop the printing process the stop flag is turned on at 220 and the Bingo Printing Process is stopped after the card presently being printed is completed. The computer then returns to game control at 224 after outputting any status reports.

When the operator chooses to start the Bingo Play Subroutine at 216, the computer automatically stops the Bingo Player Entry Process. This is done by busying out the telephone ports of the system as the call on each port is finished. The reason for stopping these processes is to stop new players from entering the game after play has started. The computer then starts the Bingo Game Subroutine 228 which runs the entire play process of selecting the balls, searching the bingo cards for winners, and informing the winners. When the Bingo Play Subroutine is finished, control is returned to the Main Control Program.

If the operator chooses to work with the Player Entry Process they are prompted to decide whether to start or stop the Entry Process at 234. If the operator chooses to start the Entry Process the Entry Subroutine is commenced at 240. Once the Entry Process has been initialized the computer returns to Game Control at 238. If the operator chooses to stop the Entry Process the operator turns on the stop flag and the Entry Process is gracefully stopped as each telephone port is busied out after completing its call. Once all reports are received by the operator, the computer returns to Game Control 238.

Figure 6:
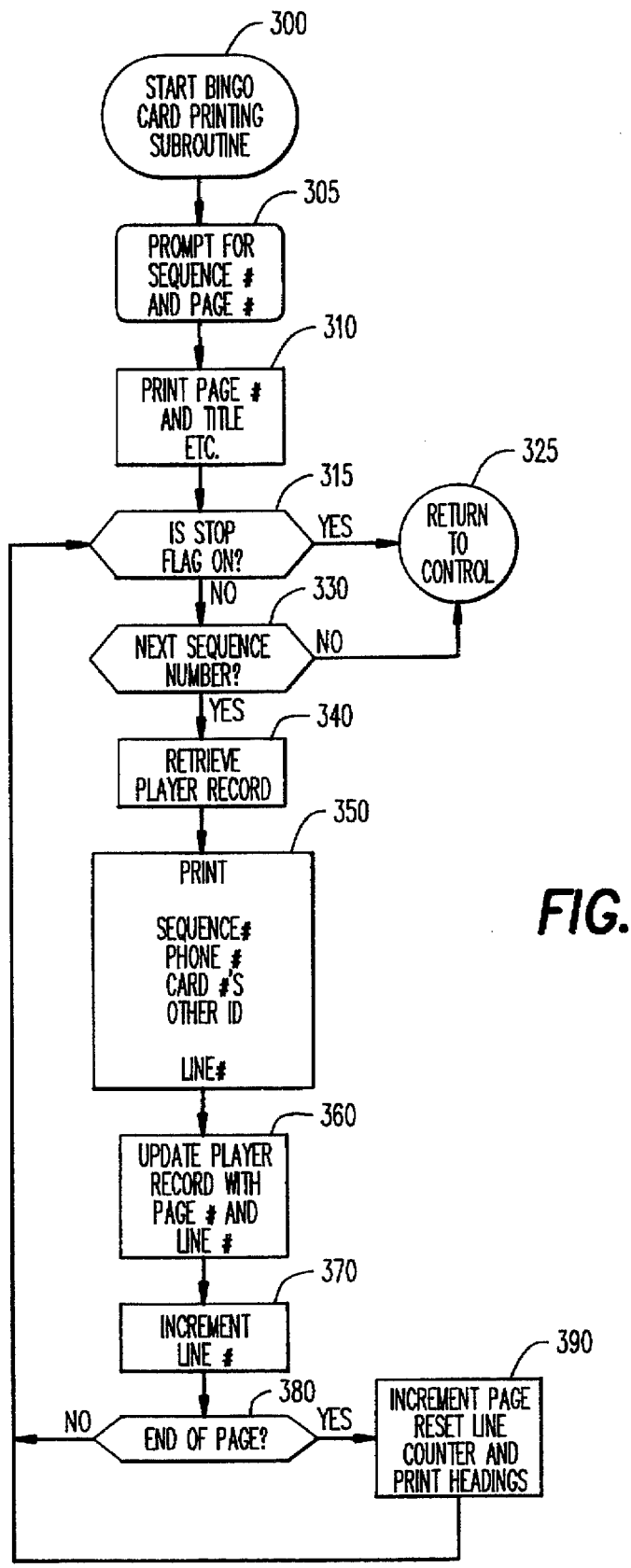
FIG. 6 is a flow chart of the bingo card print subroutine.

All parts of the Main Control Program 200 run simultaneously and the operator interrupts any process and displays the status of the process at any time through the game control terminal 204. The Bingo Card Printing Subroutine is illustrated in the flowchart of FIG. 6 and begins at step 300 with the Start of the Printing Subroutine. The computer prompts for the last sequence number that was printed and the new page number to start printing the bingo cards with the player selected numbers at 305. Step 305 is included if there is a problem such as a paper jam with a printer or to start the printing process.

At 310 the printer heads up the new page with a title, new page number, current date and game number. This is followed by a check at 315 if the stop flag is on. If the flag is on the printer skips to a new page, prints any summary statistics and returns to control at 325.

If the stop flag at 315 is not on the system checks if there are any more sequence numbers to be printed at 330. If no more sequence numbers remain, the system loops at 325 until another is created or the stop flag is set.

If a sequence number is available the player record associated with that sequence number is retrieved at 340. This information includes the player phone number and other identifying data and the numbers the player selected on input. This information with the sequence number is printed at 350.

The stored player record is updated at 360 with the line number and page number where the player data was printed so that this page can be quickly retrieved from the stored lock box if this player's card is a winner.

The line number counter is incremented at 370 and tested to see if it is the last line on a page at 380. If page completed the printer skips to a new page at 390 and prints up new headings for the page. The program checks if the stop flag is set at 315 and carries on printing if not set.

If the page is not finished, the program checks the stop flag at 315 and carries on printing ff not set.

Figure 4:
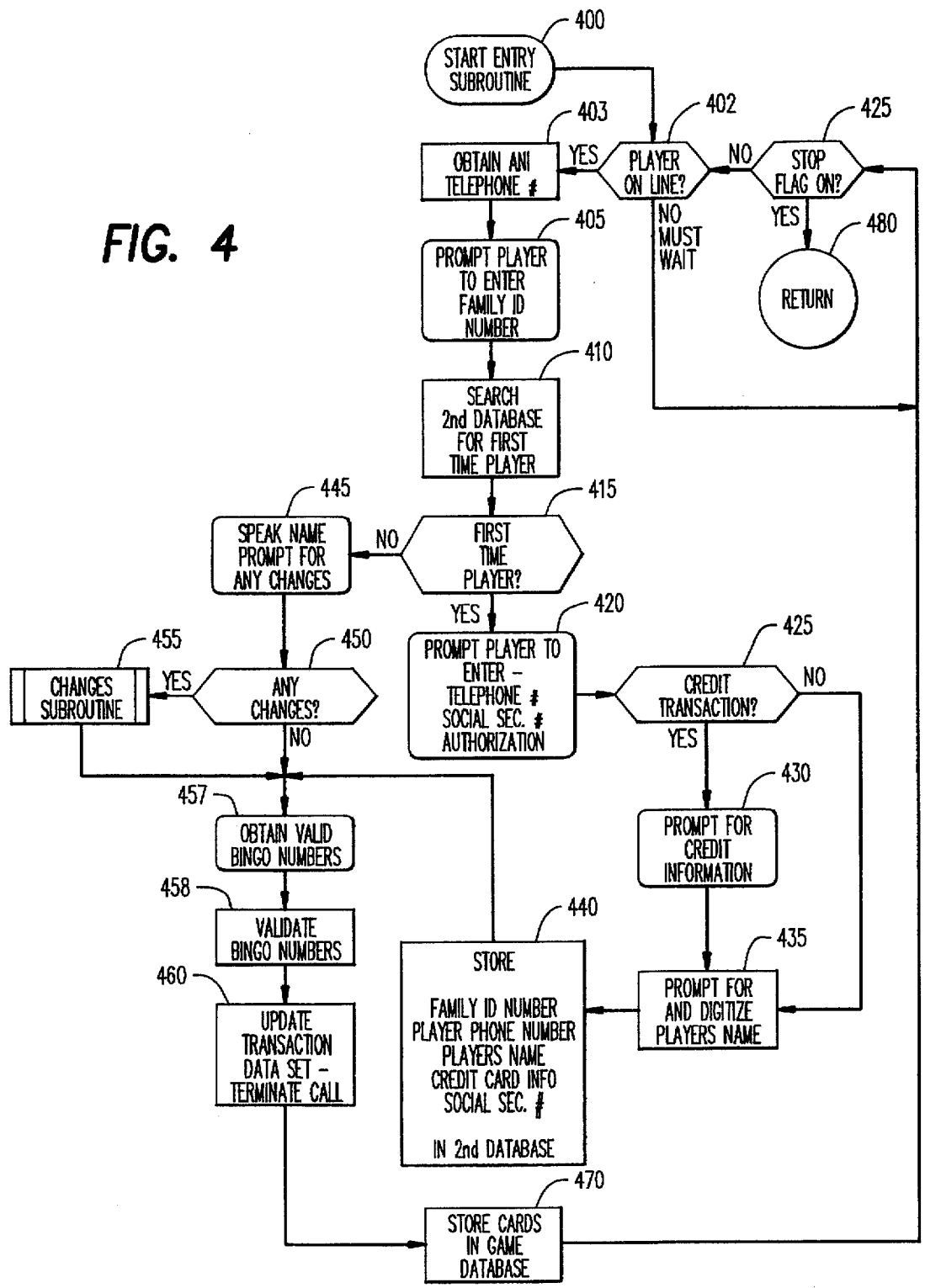
FIG. 4 is a flow chart of the Player Entry Subroutine.

FIG. 4 illustrates an overview of the Bingo Game Entry Process. The subroutine starts at 400 and waits until a player calls in and is connected to a telephone port 402. As soon as a player is connected, the system obtains the player's phone number at 403, for example via the ANI (Automated Number Identification) service provided by the Telephone Company. The player then inputs a personal identification number at 405, which might be a maximum of two digits.

The computer then searches the Bingo Player Data Set of the Bingo Game Database (2nd Database) at 410 to determine if the player has previously played at 415. If the player is playing for the first time, the computer prompts the player to enter a short personal identification number. In situations where entry by minors is of concern the system can require the input of a social security number, credit card number, or other indication of age at 420. The computer determines whether the transaction is a credit transaction or a '900' number transaction at 425 by the phone number dialled by the player. If the transaction is a credit transaction the player is prompted for their credit information at 430. Whether the transaction is a credit transaction or not, the first time player is prompted to speak their name which is digitized at 435. All of the player information: social security number, the telephone number, credit information, identification number, authorization to use an agent, and the digitized record of the player's name is stored in the appropriate Data Sets of the Bingo Game Database (the 2nd Database) at 440.

If the player is not a first time player at 415, the player's name as recorded in the Bingo Card Data Set of the Bingo Game Database is spoken and the player is asked at 445 whether the player wishes to change any of the entry information from the last entry. If the player has no changes at 450, he is prompted to confirm his name by pressing the digit '1' on a Touch Tone (DTMF) telephone. The player is then requested at 457 to input the selected bingo numbers to be played on the player's card. These numbers are edited by the system at 458 to be between one and thirty inclusive and without duplication. When the player has entered eight correct numbers the call is terminated at 460. It should be noted that if the player is a credit card player, the player does not have to enter a credit card number for another game of bingo if the same credit card is to be billed. If there are changes to be made, the player presses the digit '2' on the Touch Tone (DTMF) telephone and the computer proceeds to the Changes Subroutine 455.

The Changes Subroutine changes any of the player's information such as the player's name, social security number, and credit information. From step 440 for a first time player and from step 455 following the Changes Subroutine, the computer updates the Transaction Data Set in a preferred embodiment which encompasses the date and time of the transaction, the transaction type, and a digital recording of the transaction, at 460. The computer terminates the call at this point and obtains credit authorization for credit card players at 460. The bingo cards are then stored at 470 sequentially in the Game Card Database.

The computer then determines if the Stop Flag has been set at 475. If the stop flag has been set it does not answer any new calls and returns to main control at 480. If the Stop Flag has not been set the computer determines if another entrant is ready to enter at 402. If there is no entrant the computer loops to 475 to check the stop flag. If there is an entrant ready the whole Bingo Game Entry Process is started over again at 405.

For players to enter a game they input their personal identification numbers into the system. To reduce entry error the player identification number should be the smallest number of digits necessary to identify a family member. The main identifier is the family telephone number which, coupled with the player's personal identifer, provides a good identification system. Thus, a player is only required to enter a relatively small number of digits to enter the bingo game.

The system records in the player database an indication whether the player called in by TouchTone telephone so that subsequent calls from the system to the player take the possible lack of Touch Tone input into account for either operator intervention or voice recognition handling.

The preferred method of entry is through a '900' number service operated by the telephone company. The '900' service generates a charge to the player's telephone bill for the designated amount to play bingo. Included in this preferred method is the input of all numbers via a Touch Tone (DTMF) telephone so that operator intervention and manual input, although available under this invention, are not required. For players without a Touch Tone (DTMF) telephone, voice recognition of the players voice input is the preferred input method. Manual input by a human operator bridged by the telephone system to the player is also acceptable.

In the Lightning Bingo game the call is not terminated after the information is obtained. Rather, the player is asked how much he wants to set up in his account, and goes on to play multiple games with the charges to play and winnings charged to the account. When the account is depleted the player may have more money credited to his account from his credit card or by charging his phone bill.

A text rendering of the player's name alternatively is determined by the user typing in his name using the alphabetic characters on the Touch Tone (DTMF) keys of the telephone. The player's name, as decoded from this input, is played back for verification and to son out possible duplicates caused by multiple alphabetic characters on each Touch Tone (DTMF) key. If a player's name doesn't exist in the name database it is automatically acquired, digitally recorded, indexed by the Touch Tone (DTMF) code and stored in the name database. This information acquisition system is utilized to gather address and other information as well as names.

The entry system of the computer has the capability to allow players to enter multiple games or to reschedule entries they have already made on other dates of play. For example a player might register to enter every game in the month of May and then reschedule or cancel the entry for the game on May 20th. Thus the users have complete control over when they wish to play and the ability to change their entries due to outside circumstances.

Another system enables players to obtain credit from the bingo game organizer in advance of playing bingo that is debited for the charges to play bingo each time the player enters a bingo game.

Figure 5:
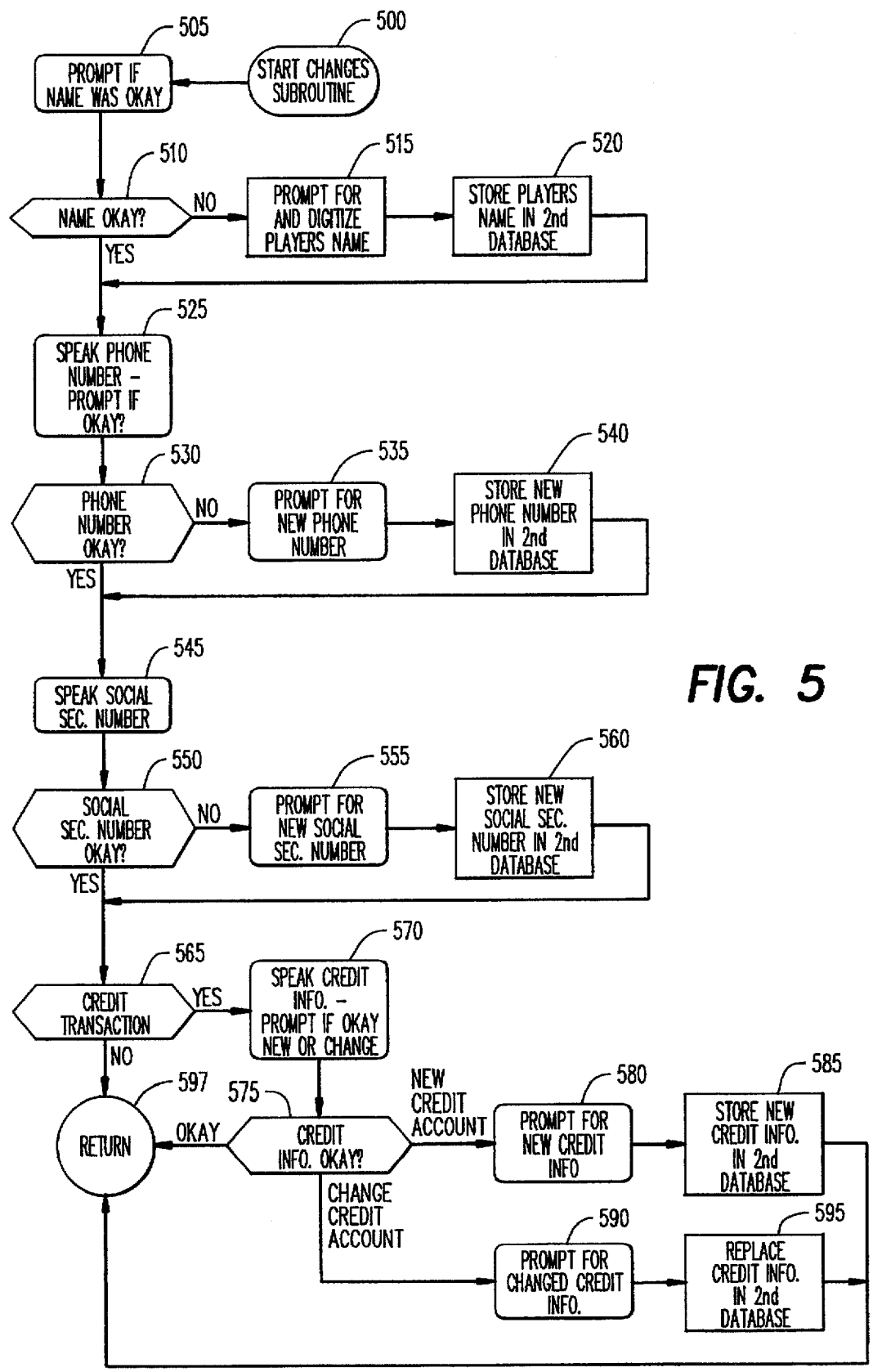
FIG. 5 is a flow chart of the Changes Subroutine.

FIG. 5 illustrates the Changes Subroutine which starts at 500. Since the player's recorded name has already been spoken during the Entry Subroutine, the computer prompts if the player's name as spoken is correct at 505. If the player indicates that the name is not correct at 510 the computer proceeds to step 515 and records the name. The computer stores the new name in the Bingo Card Data Set of the Bingo Game Database (2nd Database) at 520, and proceeds to step 525. If the name is correct the computer speaks the player's phone number at 530. If the player's phone number is not correct the player is prompted for a new phone number at 535. This phone number is then stored at 540 and the computer proceeds to step 545. The computer speaks the Social Security number or similar type of personal identification number at 545. The computer then prompts whether the Social Security Number is correct at 550. If the Social Security Number is incorrect the computer prompts for a new Social Security Number at 555 and stores it in the Bingo Game Data Set of the Bingo Game Database (2nd Database) at 560. The computer determines if the transaction is a credit transaction at 565. When the transaction is not a credit transaction the computer returns to the Entry Subroutine. When the transaction is a credit transaction the computer speaks the last credit information which was used to bill the player's last bingo game at 570. The computer then prompts the player to decide whether the player wants to use the identified credit method, if he wants to change the credit method information, or if he wants to enter a new credit information for billing purposes 575. If the credit method identified is correct the computer returns to the entry subroutine at 597. If the player wants to enter a new credit account the computer prompts for the new credit account information at 580, stores it in the Credit Data Set of the Bingo Game Database at 585, and returns to the Entry Subroutine at 597. When the player wants to change the credit method, the computer prompts for the changes to the credit information at 590 and records it in the Credit Data Set of the Bingo Game Database at 595, after which the computer returns to the Entry Subroutine at 597.

In a preferred embodiment the player does not have to input a home telephone number if the telephone company provides the Automatic Number Identification service (ANI). This ANI service is also date and time stamped and digitally stored for security.

The ANI (Automatic Number Identification) service, when delivered over a telephone company's ISDN (Integrated Services Digital Network), provides the callers telephone number between the four second dial ringing intervals. This allows the computer system to look up the potential player in the second database to determine if he has paid his telephone bills for the charges to play bingo. If he has not paid, the computer system directs the telephone system to disconnect the player, with a voice response message if desired, prior to any '900' charges being accepted by the system.

Figure 7:
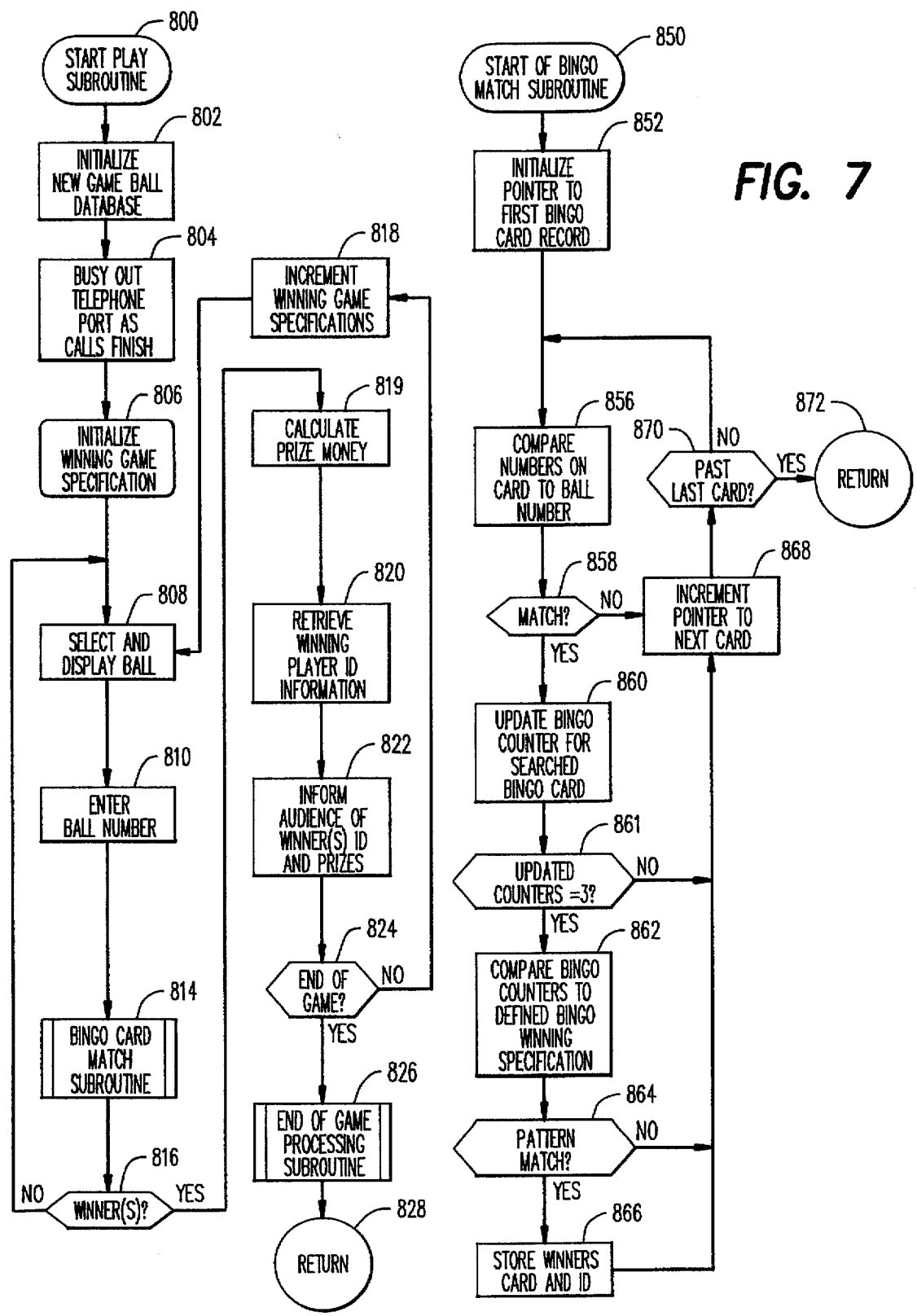
FIG. 7 is a flow chart of the Bingo Game Play Subroutine.

FIG. 7 illustrates the Bingo Play Subroutine starting at step 800. The first process of the Bingo Play Subroutine is to initialize the pointers for the Game Card Database, and initialize a new Game Ball Database at 802. All the telephone ports within the system are busied out as the calls on the lines are finished at 804. Preventing players or play along players from calling in while the game is in progress allows the support computer system processors to use all of their capacity on the Play Subroutine. The computer then prompts for the definition of the Winning Game Specifications at 806 or obtains them from a file. The Winning Game Specifications represent the defined pattern on the bingo card which must be fulfilled to determine a winner, the maximum number of drawn bails in which it must be achieved, or the follow up ball specification if more bails can be drawn after a first bingo. For example, if there were three games defined, the first game requiring a marker on each of four comers; the second game requiring players to fill in the square of all eight numbers around the outside of the bingo card; and the final game providing a minor winning status to players who achieve a bingo on the next ball called. A file is created which is read in to the computer which defines the Winning Game Patterns. This file can be changed at any time before each game at 806. Otherwise the computer automatically reads in this file without any human intervention.

At the appropriate time the first bingo ball is selected at 808 and displayed. In the non-automatic system the bingo ball is selected by a mechanical bingo ball selector which is operated by the announcer. A picture of the selected bingo ball is then broadcast to the television audience or audio broadcast over radio. In the automatic system the bingo balls are randomly generated. A graphically generated picture of the bingo balls with associated text overlays and audio is then broadcast to the television audience.

Regardless of whether the automated or non-automated system is used, the selected ball number is entered or made available to the computer system at 810. In the non-automatic system this is manually input and in the automatic system it is internally determined by the computer system.

While the selected bingo ball is broadcast to the television audience the computer system searches through all the bingo cards in the Game Card Database to determine the matches for the selected bingo ball at 814. This is accomplished by the Bingo Match Subroutine 850.

Once all the cards have been searched for the selected bingo ball and all the bingo counters have been updated, the computer determines if there has been a winner at 816. The computer determines if there is a winner by the player identification numbers returned from the Bingo Match Subroutine. If there is no winner the computer selects the next ball at 808. If there is a winner the computer calculates the prize money at 819, retrieves the winning player(s) identification information at 820 and informs the audience of the winners and prize at 822. The computer then decides if the last win represented the End of Bingo Game at 824 and if all the Winning Game Patterns are completed. If the Bingo Game is at an end the computer goes to the End of Game Processing Subroutine 826 and returns to Main Program Control at 828. If the game is not at an end the Winning Game Pattern is incremented to the next pattern or criteria specified at 818 and the next ball is selected at 808.

The Bingo Game Match Subroutine 850 processes all of the bingo cards stored in the Game Card Database and attempts to match the selected bingo ball with the card numbers and update the appropriate bingo counters when a match is found. The computer initializes the pointers in memory to the first card in the Game Card Database at 852. The computer searches the eight numbers on the player's card for the selected ball number at 856. In the preferred embodiment the numbers on the player's card are sorted to optimize the search speed in games where there is no positional criteria such as four corners. The computer determines if there is a match within the list of numbers at 858. If there is a match the computer updates the appropriate bingo counters associated with the searched bingo card at 860. If there is no positional criteria the system updates one counter per player which keeps track of when a player has matched eight balls on his card. If there are positional criteria the bingo card counters which are incremented is determined by the column and row position of the matched number on the card. When one of the bingo counters reach three at 861, the bingo counters are compared to the currently defined Winning Game Specification in play at 862 and 864.

If there is no match on the card being searched at 858, or no pattern match at 864, or the computer has recorded the player identification of a winner at 866, or if the counter(s) didn't increment to three at 861, the computer increments the pointers to the Game Card Database to process the next card at 868. If all the cards in the Game Card Database have been searched at 870, the computer returns to the Bingo Play Subroutine at 872. If there are still more cards in the Game Card Database to search, the computer loops and searches the next card at 856.

Since the computer system knows the winners instantaneously, a telephone winner confirmation process is not required; therefore it is practical to have follow-along winners after the first bingo win. For example the players obtaining a bingo on the next ball called after an original bingo can win a smaller consolation prize. This concept increases the number of winners in the mass audience bingo game and assists in maintaining player interest.

Figure 8:
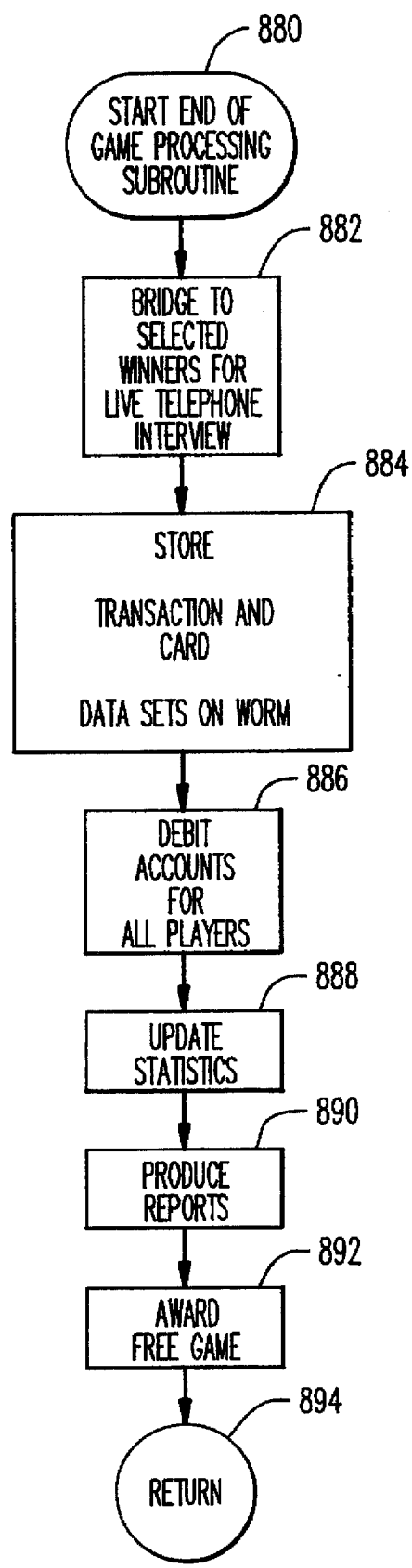
FIG. 8 is a flow chart of the end of game subroutine.

FIG. 8 illustrates the End of Game Processing and starts at step 880. At 882 the computer bridges to selected winners of the bingo game just finished. For example, the computer searches the Bingo Game Database in the Bingo Game Data Set for the winners' names and telephone numbers. The computer telephones the winners and by voice response informs them of their winning status. Alternatively, the computer bridges the winner to an announcer who performs an on-air interview. Once all the interviews have occurred the computer writes all the Transactions and Credit Data Sets to a WORM (Write Once Read Many Times) disk at 884. This is done for backup purposes as well as security against errors and fraud. The computer debits all the credit accounts for the credit players at 886.

The computer updates all the relevant statistics in the Statistical Database at 888. The statistics for the game just played are added to the historical data and any records that the game just set are also stored. Also, the Bingo Game Data Set is updated to record the players who had just played. The computer produces reports at 890 to inform the organizers of all aspects of the bingo game: who won the individual games, how much the winners won, and the phone numbers of the winners. Other information is also provided such as the total number of players, the total number of winners, how many players played using the 900 number, how many players used credit to play, and how many free games were played in this game versus how many free games were given out. A frequency plot of the players' geographic locations is obtained by breaking the players' telephone numbers into area codes and area exchanges.

The computer system is immediately aware of all the players entered in the bingo game and makes this statistic available to the announcers and management. This feature also allows the computer system to calculate a variable set of prizes based on the number of entries which varies with the number of players.

The computer system records the selected players who receive free games. These players are chosen at any time based on varying criterion such as when they last played, when they received their last free game, and the frequency of their play. The computer can target those players who have played in the past but who have not played recently. The computer upon selecting these players turns on the Free Game Indicator in the Bingo Card Data Set in the Bingo Game Database at 892 for these players. The computer returns to the Play Subroutine at 894 which then returns to the Main Program Control.

In Lightning bingo the player obtains a portion of his money back every time one of his selected numbers is matched by a drawn ball. The player wins the game by matching all three of his selected numbers before any other player matches his numbers. This requires a simpler counter scheme with only one counter, in comparison with the standard Do-It-Yourself bingo game.

As can be seen, various types of information are stored in different databases. An example of the types of information that can be stored in the databases is set forth in Appendix A.

This invention has been described as a television game show; however, nothing in the invention precludes the game information from being distributed by many alternative methods using the telephone as the input means or the two way functionality of the distribution means. These distribution means range from: radio broadcast, telephone system, two way cable systems, digital communication networks, fibre optics distribution systems, radio telephone, and satellite television broadcast means.

Another alternative to the distribution means mentioned above is the facsimile machine. When the fax machine is connected to a computer system that has character recognition capability, player hand-written information can be automatically entered into a game. This information could be the player selected numbers, credit card numbers, name and address, etc., all of which can be entered in the database or printed out by the computer at the game site. The computer can also construct its own faxes, address them and send them to the remote players. The content of these constructed faxes could be a blank, ready-to-fill card form with the player's name, address and previous credit information, the previous balls drawn, and how much they won in the last game. Players could also complete lottery or keno cards using facsimile machines and have these entries printed at the game site for any required verification purposes.

In certain cases television broadcast or cable TV capacity will not be available to distribute the program. In this situation the telephone alone can provide the functionality required. Players can enter their selected bingo numbers, have their bingo cards printed out at the local bingo hall, stored in the lock box, then entered and played in the game. The announcer's voice will be heard over the telephone connection, announcing each ball as drawn. The telephone system can also communicate with the player over the same telephone connection, informing the player of any draw downs of the ante or the exact amount of any winnings.

Figure 9:
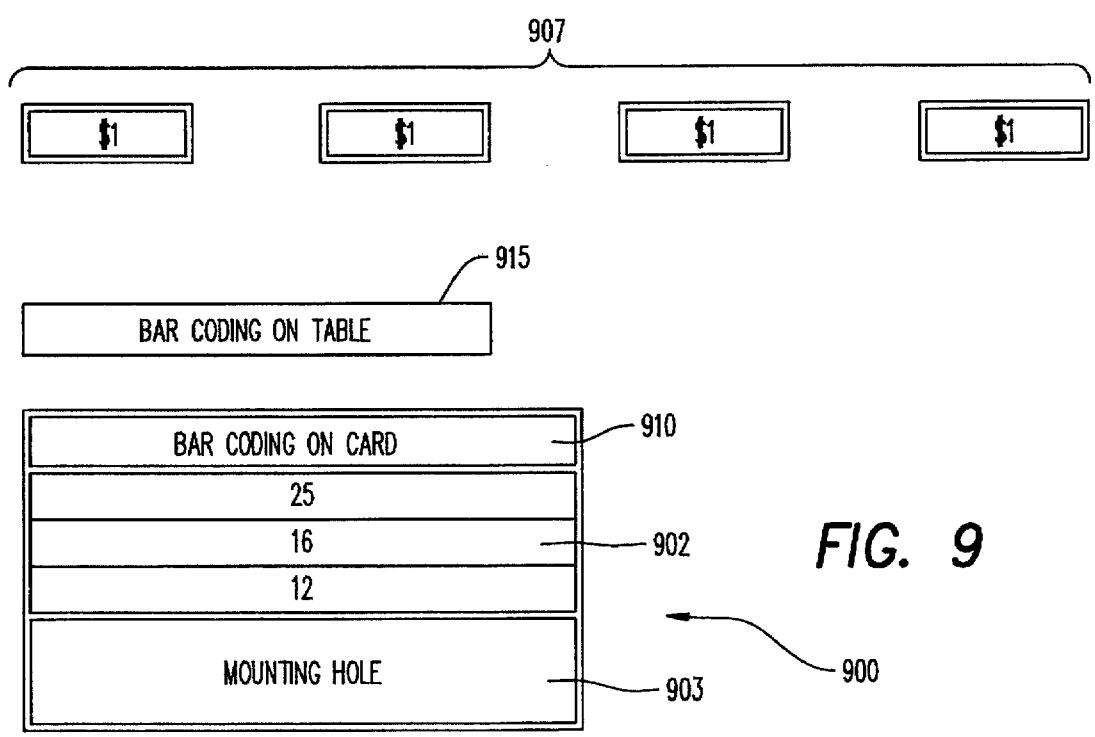
FIG. 9 illustrates a local Lightning bingo card & ante.

In this regard FIG. 9 illustrates a Lightning bingo card that can be used in high stakes bingo halls. The physical card 900 has three numbers printed on it 902 between one and thirty. The player might choose his card from the many cards hung on pegs around the bingo area, e.g., using mounting hole 903, in effect selecting his own numbers to play in the game. When the game commences the local player is required to ante up four dollars 907 which is placed in front of his card 900. Staff from the bingo hall pass around and immediately pick up one dollar as the house fee for managing the game. The master of ceremonies selects a ball at random from a set of thirty balls and if a player matches one of the numbers 902 on his card with one of the balls drawn, the player takes one dollar back from the ante 907. The game continues until one player is the first to match all his numbers. He shouts bingo and receives all the remaining antes from the other unsuccessful players for winning.

In this particular diagram there is a bar code area 910 at the front of the card which describes the numbers on the card 902 in machine readable form and another bar code area 915 which indicates numerically where the player sits at the game table for identification purposes. These bar codes allow the game room staff to rapidly input the local player data into the system so that local players and remote players are controlled by the same computer system and variable prizes are quickly calculated.

Figure 10:
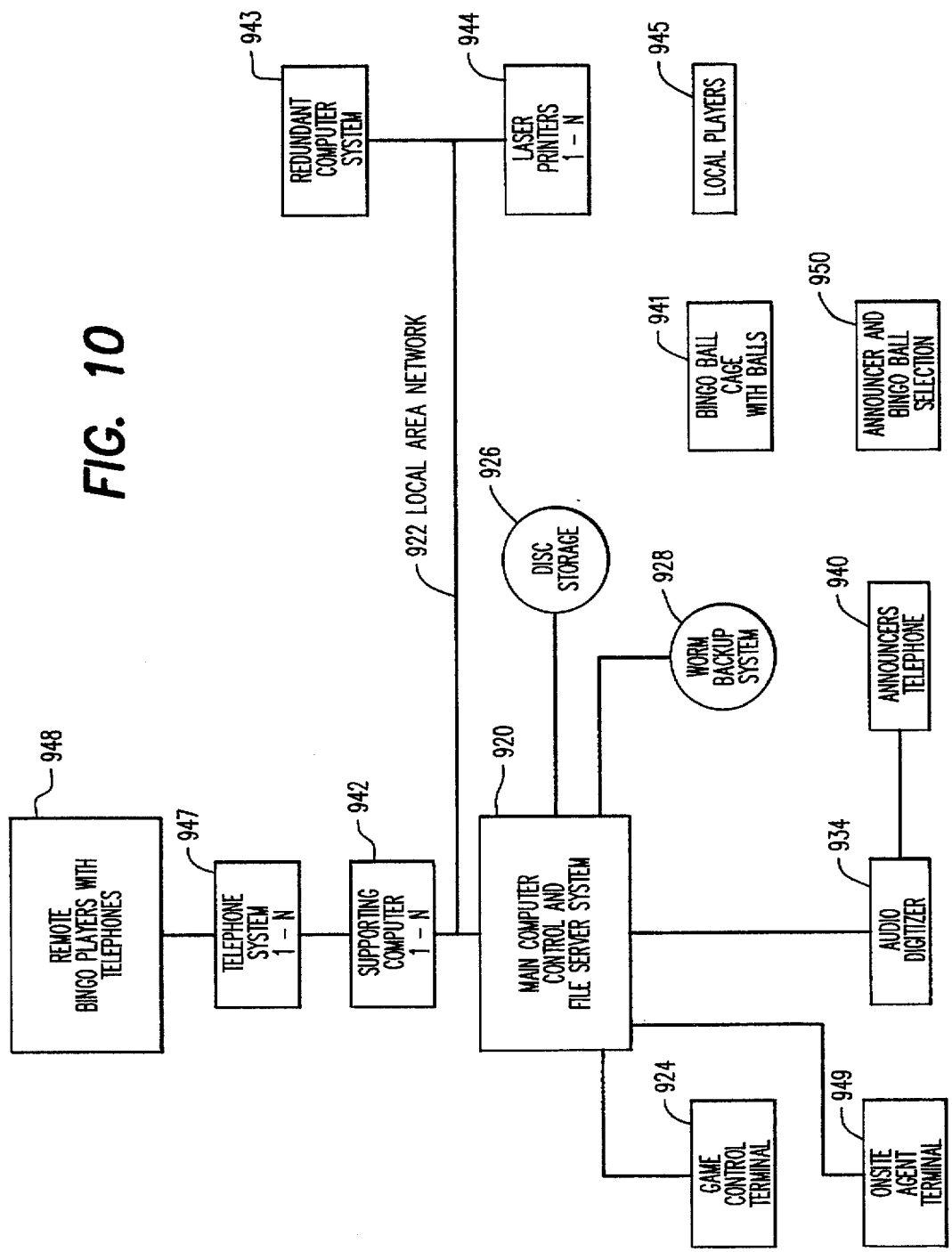
FIG. 10 is a block diagram of the system components for remote players to play in a local Lightning bingo game.

Referring more particularly to FIG. 10, there is shown a generalized block diagram illustrating a computer-supported telephone gaming system that locally prints bingo cards where the remote player has selected three numbers on a Lightning bingo card and plays these cards in a telephone bingo game held in a location remote from the viewer. This system includes a general purpose CPU 920 which controls all aspects of the invention and also acts as a file server connected to a LAN (Local Area Network) 922. The computer system is controlled by instructions that are input into the Game Control Terminal 924. The CPU 920 contains the computer programming means to start up, interact with, and control all the peripheral devices that make up the television bingo system. A disk storage system 926 is directly connected to the CPU 920. The disk stores all the files and programs for the system which are shared by the other computer processors connected to the LAN 922. The files stored in the disc storage system contain information such as the player's telephone number, touch tone indicator, name, address, family identification number, credit card type, number, and expiry date, a digitized recording of the player's name and authorization for the agent to play his card and a record of all transactions.

Files are directly backed up on to a connected WORM (Write Once Read Many Times) disk 928; a non erasable removable compact disk system that provides overall system security, protection from fraud and a permanent audit trail of all transactions.

A telephone system 947 is also connected to the CPU 920. The telephone system 947 accepts Touch Tone (DTMF) input and converts it to digital data for use by the CPU 920. It prompts for user input by voice response and accepts voice input by voice recognition from players without Touch Tone telephones. The voice generating function of the telephone system, when directed by the CPU 920, speaks audio messages describing the bingo game to the bingo players 948. The telephone system 947 has the ability to bridge together players, announcers, or customer service operators.

The local area network 922 links the CPU 920 with a series of N supporting computer systems 942 and a redundant computer system 943. The supporting computer system 942 directs and controls the attached telephone system 947 connected to it that accepts calls from bingo players. This telephone system in the preferred embodiment has voice response means to prompt the players to input a personal identification number and the numbers selected for the bingo card and other required information. The telephone system also has Touch Tone (DTMF) decoding means so that it converts the player's Touch Tone (DTMF) input to ASCII characters for transmission to the supporting computer system 942 where it is stored in the Bingo Game Database in the disk storage system 926. The telephone system has DNIS (Dialled Number Identification Service) which determines which programs to bring up to handle the player's call by examining the telephone number the player dialled. For example if the player dialled 1-900-TVBINGO the system responds to the call with prompts for a 900 type of call as opposed to an 800 style call. In a preferred embodiment of the invention the telephone systems have voice recognition capability so that bingo players without Touch Tone (DTMF) telephones input the required information by spoken words and numbers. In the diagram of FIG. 10 just one supporting computer system 942 is shown, however, the number of these systems connected to the LAN 911 is varied accordingly to the number and distribution of the player telephone calls to enter the bingo games.

The bingo cards on which the players selected the numbers are stored in the memory of the support computer system 941 and are played in the bingo game using the computing resources of the support computer system 942. The support computer system 942 reports any winners among its players to the main CPU 920 which calculates the prize money and instructs the support computer system 942 to inform the winning players. The support computer 942 processes every bingo card for each bingo ball selected and the processing for each ball is completed in the time it takes to draw and display the next bingo ball.

The telephone system 947 acquires player names and other information; digitally records it and transmits this information via the LAN 922 to the CPU 920 for storage and retrieval on the disc storage means 926.

To enter a game the remote player calls the advertised 800 number and is prompted to give his identification number, which along with the telephone number supplied by the Automated Number Identification service supplied by the telephone company identifies the remote player. The system asks for the player's credit information and the amount to set up as the player's account and the three numbers the player wishes to have played. This information is transmitted to the main computer 920 and stored in the player and transaction database as well as being stored on the support computer 942 for play during the game. The main computer system 920 then directs the printer 944 to print out a list of the sequence numbers, the player selected game numbers and the player identification as proof of entry to all the other players. Where necessary, for example to meet legal requirements, an agent can monitor and participate in games via terminal 949.

At the start of each game the local players select a game card with three numbers printed on it which are between one and thirty. A list of all the remote players' cards is printed out by the printer 944, including the players' selected bingo numbers, the card sequence number and player identification. As the remote players' bingo cards are printed the computer system 920 debits their account for the entry fee or ante.

When the game commences the announcer 950 selects the first ball from the ball cage 941 and shows it to the local audience 945, then the ball is announced over the telephone to inform the remote players 948. The ball is then entered into the computer system 920 using the game control terminal 924 which passes the ball number selected to the support computer systems 942. The support computer system 942 then tries to match the selected ball with the numbers on the stored bingo cards in its memory. The game continues with the announcer drawing balls until a local player shouts bingo or the system informs the announcer of a remote winner on the game control terminal 924.

The first object of the Lightning bingo game is to have one of the player selected bingo numbers be matched by the randomly selected game balls. Each time there is a match the support computer system 942 directs the main computer system 920 to draw back one dollar from the ante into the player's account. The second objective is to be the first player to have all selected numbers matched by the drawn balls. The first player to do this is the winner whose account is credited with all the money anted up by the unsuccessful players. In some cases more then one player obtains a bingo at the same time and they share the prize money.

If the winner is a local player his card is checked by management or other local auditors to determine if the preprinted numbers on the card match the balls drawn.

If the winner is a remote player the computer system 920 causes the printer 944 to print out a copy of the remote player's card including the selected numbers, the card sequence number, page and line number in the list and the player identification. The page and line number are used to locate the remote player's card in the list. The player selected numbers on the player's bingo card are compared with the balls as drawn to verify the win of the remote player.

A redundant computer system 943 is connected via the LAN 922 to the CPU 920 to serve as a backup processor in case of failure of one of the support computer systems, similar to FIG. 1.

The CPU 920 is shown in FIG. 10 in a single processor configuration; however, for redundancy purposes another similar system is attached to the LAN 922 and constantly updated so that control of the overall system is maintained should the main CPU system 920 fail.

Figure 11:
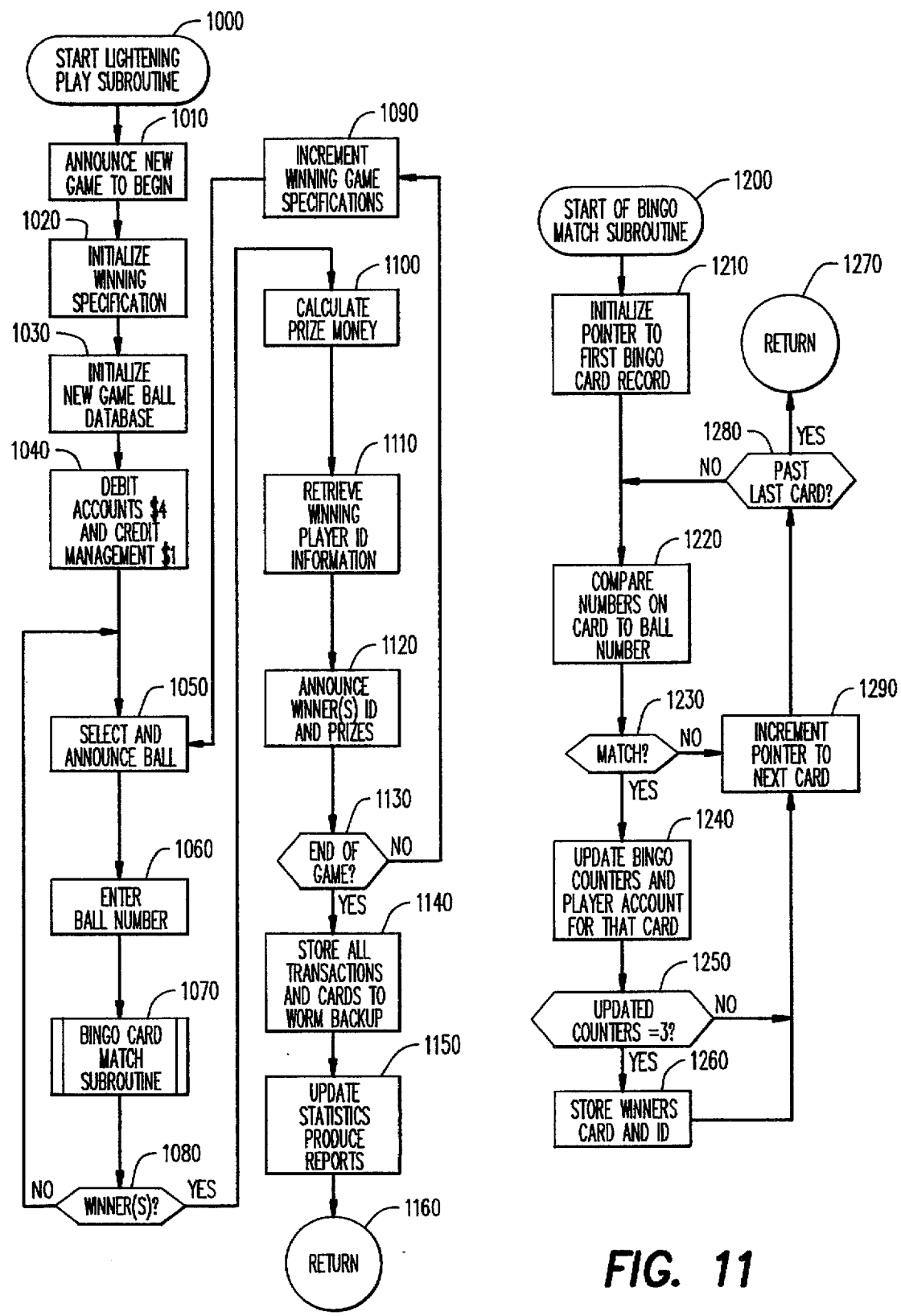
FIG. 11 is a flow chart of the Lightning bingo play subroutine.

The overall operation of Lightning bingo is similar to the operation of the Do-It-Yourself bingo in the entry, card printing and main control program. The game playing routine is slightly different as is illustrated in FIG. 11 beginning at 1000.

The announcer informs all the players that a new game is about to commence at 1010 and the game specifications for the next game are initialized at 1020. Since it is a new game the game ball database is initialized at 1030. Next the player accounts are debited four dollars to play the game at 1040, and one dollar of this is credited to the game managements account.

At 1050 the announcer selects the first ball and announces it to the players in the hall and to the remote telephone players. The number on the ball is entered into the system at step 1060. The system now proceeds to the bingo card match subroutine at step 1070, where it tries to match the ball number with the stored cards at 1200. With the first ball the pointer to the player cards is initialized at the start of all the cards at 1210. The comparison is made at 1220 and if there is a match at 1230 the counters for that card are incremented and the player's account is updated by one dollar at 1240.

The value of the counters is checked at 1250 and ff the counter equals three the card is a winner's card and is stored at 1260. If the counters are less then three the system increments the card pointers to the next card at 1290, as it also does when there a has been a winner at 1260. At 1280 a check is made for the last card and the system keeps checking cards until that ball has been compared to every card. When the last card is reached the system returns at 1270 and checks ff a winner has been determined at 1080. Since this is the first ball no win has occurred and the next ball is drawn at 1050.

More balls are selected and compared until there is a winner at 1080. At this time the system calculates the prize money at 1100 by taking all the players' anted amounts, subtracting the one dollar drawbacks and dividing this amount by the number of winners on that particular ball.

The winning player's identification is retrieved at 1110 and provided to the announcer who informs the local and remote players who won the game and the mount of the prize money at 1120. In certain cases there can be more than one game, this is tested at 1130 and if there is, the new game specifications are loaded at 1090 and more balls are drawn at 1050.

If there are no more games within the game the system stores all the transactions for that game at 1140, updates any statistics and produces any reports at 1150 before returning to control at 1160.

To add interest to the game the support computers that are playing the game and talking to the players can have voices with different personalities. This could mimic the social aspects of the bingo hall where various players make sympathetic comments when things go wrong and positive comments when the player is winning or having better luck.

Similarly, terminals or personal computers used as terminals connected to digital communication networks such as Internet, Prodigy, Compuserve or one of the other on-line services can provide the player-selected bingo numbers to the system. The bingo game information is then provided back to the remote players by the communication network which is connected to the computer system. This functionality is available for either Do-It-Yourself bingo or Lightning bingo where the player is connected to the system throughout the game.

The Do-It-Yourself invention is based on a bingo game where local and remote players play in the same game. There are situations however where it is not practical to have local players, for instance a game held at three in the morning for night-owl television viewers. In these circumstances displaying the remote players' cards on the television screen reassures all players of the legitimacy of the game.

The local game of keno is played in a similar manner to the local Do-It-Yourself bingo described in the invention, in that the player selects numbers on a two-part entry form, keeping one copy for himself and the other copy is picked up by the keno operating staff. This separation of the forms performs the same function as the lock box. Random balls are called and the player marks his card to determine if he is a local winner. The duplicate copy is used to verify that the player did not change any of the numbers originally selected.

To add remote players to this Keno game the same system is used as in the Do-It-Yourself bingo game wherein the player selects numbers, the cards are printed out and the random balls played against the cards stored in the computer, to determine if a remote player is a winner. The computer is able to calculate the variable prize money and identify the winner.

In some games it may be necessary to indicate to the system the locations of the numbers selected such as a grid location. In other circumstances some form of alphabetic input in a specific location may be required. The telephone interface of the invention is able to handle both alphabetic and numeric information and place it in the required specific locations.

In many lotteries it is possible for the player to request the computer system to pick the numbers for the player. This functionality is available if the bingo player indicates via the telephone system that he wishes the computer to pick the bingo numbers. The computer system will provide these automatically selected numbers to the player through the voice generating ability of the telephone system.

In situations where the location of the bingo game is in a restricted area, such as an Indian reservation, it may be advantageous to have all the facilities on one site for legal reasons. Current law allows certain groups to hold bingos without the same restrictions that apply to state and locally regulated local bingos. This invention envisions a TV bingo operated in a restricted area to be telecast nationally with the prize money commensurate with the number of players produced from a national TV game show. This game may require a player at&.home calling a '900' number that terminates at the restricted area to authorize a local agent to play the bingo cards where the player selected the numbers on the cards, and having the agent forward any prize money to the player by .mail or other means. The agent plays all the bingo cards for the remote players in the same game with other on-site bingo players. The agent is informed by a screen attached to the computer system whether any of the players he represents are winners of the bingo game. The request to authorize an on-site agent to play the player's bingo card is input on the first time entry of the set of bingo cards and is digitally recorded to WORM (Write Once Read Many Times) disc for ,audit and verification purposes. On subsequent entries the player confirms the authorization for an on-site agent to enter and play the indicated bingo cards.

Although the current invention envisions a single player in the home using one telephone to play in the game, it may be desirable to have more then one player use this single telephone to access the system. If there is more than one player from the household, the system can prompt for the first player's entries, then for the second players, including two or more separate credit card accounts. The input just prior to a game is very short and multiple players from a single household are easily accommodated by the system. A speaker phone is the best telephone appliance for multiple players to use in the same household.

During the day the utilization of the telephone systems accepting entries or playing Lightning bingo may vary substantially from hour to hour. It is an intention of this invention that this surplus telephone capacity be used to make outgoing calls to potential players to promote entry into the game.

If all the game playing ports are in use, extra ports can be used to accept the overflow calls and inform the player that he can be called back when capacity is available. This will produce the most performance out of the available capacity as well as smoothing the capacity growth requirements.

Appendix A

Example of Bingo Databases

I. Do-It-Yourself Game Card Database

1. Telephone number for each bingo card.
2. Personal identification number for each card.
3. Digital representation of person's spoken name.
4. Selected bingo card numbers.

II. Bingo Game Database

Bingo Player Data Set

1. Player telephone number.
2. Player's personal identification number.
3. Player's digitally recorded name.
4. Social Security Number.
5. Authorization for on-site agent.
6. Touch Tone Telephone Indicator.
7. Plays this week, month, year, month ago . . .
8. Free game awarded this week, month, year.
9. Free game indicator for next game.
10. Bad Credit Rating Indicator.

Transaction Data Set

1. Bingo card telephone and player ID number.
2. Transaction time and date.
3. Transaction type - 900 number, card, free . . .
4. Digital recording of transaction.
5. Telephone Port # and Support Computer #.
6. Authorization of an on-site agent.

Credit Data Set

1. Player ID Number. (telephone # and ID)
2. Credit Card Number and Expiry Date.

Transaction Set

1. Player Identification Number.
2. Transaction date and time.
3. Credit card number and authorization number.
4. Transaction Amount.

What is claimed is:

1. A system for both local and remote players to play in a game wherein a remote player selects game numbers for entry and play in the same game that local players select numbers and play, comprising:

(A) a managing computer system for controlling peripheral systems and operating programs that accept and store game numbers selected by remote players, and play these game numbers against local randomly drawn numbers to determine if any of the remote players are winners;

(B) a communications system for providing to the computer system game information received via a communications connection which pertains to at least an identification of a remote player and the player-selected game numbers;

(C) a first database for storing information relating to the remote player-selected game information and the associated player identification that was received via the communications connection;

(D) means for printing game cards with the selected game numbers of the remote players and the associated player identification as physical proof of entry into the game;

(E) means to store duplicate cards of the local players' entries and the cards containing the selected bingo game numbers of the remote players' entries;

(F) means to randomly select game numbers;

(G) means to inform the players of the selected game numbers and game information;

(H) means to enter these random game numbers into the computer system;

(I) means to determine when the game numbers as they are drawn match all the remote player-selected game numbers stored in the first database to produce remote winner(s) of the game; and (J) means to determine and inform all of the players of the identification of the winning players.

2. The system of claim 1 wherein at the end of a game, a duplicate of the remote winner's card and the associated player identification information is printed for matching with the original entry cards stored in the storage means as proof that the winning player is properly entered and the remote player's card contains the unaltered winning numbers.

3. The system of claim 1 wherein the physical location of each player's card is stored in the first database associated with the player's bingo card for later rapid retrieval from the storage means to locate a winner's card within the set of all game cards stored in the storage means.

4. The system of claim 1 wherein the communications system acquires and the computer system organizes game information and stores and updates this information in a related second database of game information that contains sets of related records describing at least some of the players, game information, game transactions, the authorization of an on-site agent, player credit information, account balances and associated credit transactions.

5. The system of claim 1 wherein said communications system comprises a telephone system.

6. The system of claim 1 wherein the means to inform the players is a television broadcast.

7. The system of claim 1 wherein the means to inform the players of the game information is by a radio broadcast.

8. The system of claim 1 wherein the selection of the remote player game information is entered into the game using a two-way cable television terminal.

9. The system of claim 1 wherein the selection of the remote player game information is entered into the game using a remote terminal connected to networked communication means which also has the capacity to provide the player with game information.

10. The system of claim 1 wherein the communications system and the means to provide the player with game information comprise an interactive television system.

11. The system of claim 5 wherein the telephone system digitally records a player's spoken name upon entry and transmits this information to the computer system where it is associated with the player's identification information and game information for storage and later retrieval.

12. The system of claim 1 wherein the communications system prompts for, accepts, digitally records and stores a remote player's authorization for an on-site agent to enter and play the player's game card as if the player was physically present at the location of the game.

13. The system of claim 1 wherein the communications system accepts a game player's credit information and stores it in a second database of game information so that the player's account is billed for the charges to play the game.

14. The system of claim 5 wherein the remote player's telephone bill is debited for the charges to play the game.

15. The system of claim 5 wherein the computer system provides security from fraud and error by directing the telephone system to digitally record information from a game entry transaction in a database of game information for later retrieval to verify questionable transactions.

16. The system of claim 1 wherein the specific location of individual items of game information is input into the system by the player.

17. The system of claim 1 wherein said game is bingo and the player selects numbers on a bingo card.

18. The system of claim 1 wherein the game is keno and wherein the player selects numbers on a keno card and indicates the amount of the wager.

19. The system of claim 1 wherein the player inputs the game numbers and other game information prior to the commencement of the game and is not connected to the communications system during the game.

20. The system of claim 1 wherein the player is continuously connected to the communications system and provides game information at any time for the duration of the current and subsequent games.

21. The system of claim 1 wherein the player directs the system to select the game numbers.

22. A system for remote players to play in a game commonly known as Lightning bingo wherein a remote player selects three numbers on a bingo card and enters this card for play into a bingo game, comprising:

(A) a managing computer system that controls peripheral systems and operates programs that accept and store game number entries from remote players, and that plays these entries against randomly drawn numbers in the lightning bingo game to determine if any of the remote players are winners;

(B) a communication system for providing to the computer system game information which pertains to at least an identification of a remote player and the three player-selected lightning bingo card numbers;

(C) a first database for storing information relating to the remote player-selected game information and the associated player identification that was received via the communication system;

(D) means for the remote players to indicate to the computer system acceptance to pay the required ante to enter and play the game;

(E) means to randomly select game numbers and inform the players of these numbers;

(F) means to input the randomly selected numbers as drawn into the computer system;

(G) means to determine when a bingo number as it is drawn matches one of the remote player-selected game numbers stored in the first database, and to draw down a portion of the player's ante as recorded in the computer system;

(H) means to determine if a player's selected numbers match all three numbers as drawn;

(I) means to determine the identification of remote winning players;

(J) means to calculate the winning dollar amount of prize money by combining the remaining antes of players;

(K) means to award the prize money to the winning players.

23. The system of claim 22 wherein the communication system is an individual's interactive television terminal.

24. The system of claim 22 wherein the communication system is a telephone system.

25. The system of claim 22 wherein the communication system is a two-way cable system upstream and television broadcast downstream.

26. The system of claim 22 wherein the communication system is a terminal connected to a two-way digital communication network.

27. The system of claim 22 wherein remote players are continuously connected to said system during the play of the bingo game.

28. The system of claim 5 wherein the computer system directs the attached telephone system to request input from the game players using interactive voice response means.

29. A method for playing games of chance wherein a remote player who wishes to play in a local game selects and enters variable game information into the same game that local players have personally selected game information for play, comprising the steps of:

(A) operating a computer system that controls peripheral systems and operates programs that accept and store game numbers that are selected by remote players, and that plays these game numbers in a local game and determines if any of the remote players are winners;

(B) accepting telephone calls from remote players wishing to play who provide to the connected computer system at least the required game information and an associated player identification;

(C) accepting game information selected by the local players written on game cards for entry into the game;

(D) storing the information related to a game card with the associated player identification received via the telephone connection in a first database in readiness to play the game;

(E) printing the game cards of the remote players and the associated player identification as physical proof of entry into the game;

(F) storing duplicate cards of the local players along with the cards printed for the remote players;

(G) selecting game numbers at random;

(H) informing the players of the selected numbers;

(I) providing to the computer system the randomly selected numbers as they are selected during the game;

(J) matching the numbers as they are selected with the stored game cards to determine the first card where all of the numbers match to produce a remote player's winning card;

(K) matching the numbers as they are selected with the local players' cards to determine the first card in the game where all the numbers match to produce a local player's winning card;

(L) determining the player identification associated with the winning game cards and informing all the players.

30. The method of claim 29 including the step of printing out the remote player winning game information with the associated player identification for matching with the original stored entry cards as proof that the Winning player is properly entered and the remote player's card contains the unaltered winning number.

31. The method of claim 29 wherein the physical location of each player's bingo card in the printout is stored in the first database associated with the player's bingo card for later rapid retrieval to locate a winner's bingo card within the set of all stored game cards.

32. The method of claim 29 wherein the telephone system acquires and the computer system organizes game information and stores and updates this information in a related second database of game information that contains sets of related records describing at least some of the players, game information, game transactions, the type of telephone, the authorization of an on-site agent, player credit information, account balances and associated credit transactions.

33. The method of claim 29 wherein the step of informing the players is carried out via a television broadcast.

34. The method of claim 29 wherein the step of informing the players of the game information is carried out by a radio broadcast.

35. The method of claim 29 wherein the selection of the remote player game information is entered into the game using a two-way cable television terminal.

36. The method of claim 29 wherein the selection of the remote player game information is entered into the game using a remote terminal connected to networked communication means which also has the capacity to provide the player with game information.

37. The method of claim 29 wherein the steps of inputting the player selected numbers and providing the player with game information is carried out by interactive television.

38. The method of claim 29 wherein the step of accepting telephone calls includes digitally recording a player's spoken name upon entry and transmiting this information to the computer system where it is associated with the player's identification information and game information for storage and later retrieval.

39. The method of claim 29 wherein the step of accepting telephone calls includes digitally recording a remote player's authorization for an on-site agent to enter and play the player's game card as if the player was physically present at the location of the game.

40. The method of claim 29 further including the step of storing a game player's credit information in a second database of game information so that the player's account is billed for the charges to play bingo.

41. The method of claim 29 further including the step of debiting a remote player's telephone bill for the charges to play the game.

42. The method of claim 29 wherein the computer system provides security from fraud and error by digitally recording information from a game entry transaction in a database of game information for later retrieval to verify questionable transactions.

43. The method of claim 29 operated as separate physical units by one or more agents located at the game site to accept game information from remote players and enter and play this information in the local game.

44. The method of claim 29 wherein the specific location of individual items of game information is input into the system by the player.

45. The method of claim 29 wherein the player inputs the game numbers and other game information prior to the commencement of the game and is not connected to the telephone system during the game.

46. The method of claim 29 wherein the player is continuously connected to the telephone system and provides game information at any time for the duration of the current and subsequent games.

47. The method of claim 29 wherein the player directs the computer system to select the game numbers.

48. A method for remote players to play in a game commonly known as Lightning bingo wherein a remote player selects three numbers on a bingo card and enters this card for play into a bingo game, comprising the steps of:

(A) operating a managing computer system that controls peripheral systems and programs that accept and store game-number entries from remote players, and that plays these entries against randomly drawn numbers in the lightning bingo game to determine if any of the remote players are winners;

(B) providing to the computer system game information received via a communication connection which pertains to at least an identification of a remote player and the three player-selected lightning bingo card numbers and which informs the players of aspects of the game as it is played;

(C) storing information in a first database relating to the remote player-selected game information and the associated player identification that was received via the communication connection;

(D) storing a remote player's wager in the computer system;

(E) randomly selecting game numbers and informing the local and remote players;

(F) inputting the randomly selected numbers as drawn into the computer system;

(G) determining when a bingo number as it is drawn matches one of the remote player-selected game numbers stored in the first database, and drawing down the player's ante as recorded in the computer system;

(H) determining if all three numbers selected by a player match the numbers that are randomly selected, thereby producing a winner of the game;

(I) determining the identification of winning players;

(J) calculating the winning dollar amount of prize money by combining the remaining antes of players; and (K) awarding the prize money to the winning players.

49. The method of claim 48 wherein the remote players remain continuously connected to the system during play of the game.

50. The method of claim 48 wherein the same system plays multiple wagering levels of the game simultaneously.

51. The method of claim 48 whereto multiple remote players located in one household use a single telephone to enter and play the Lightning bingo game.

52. The system of claim 22 wherein the same system plays multiple wagering levels of the game simultaneously.

53. The system of claim 1 wherein the number of randomly selected game numbers is fixed and prizes are awarded on the basis of the number of randomly selected game numbers that match player-selected game numbers.

* * * * *